United States Patent
Mito et al.

(10) Patent No.: US 8,023,039 B2
(45) Date of Patent: Sep. 20, 2011

(54) IMAGE CAPTURE APPARATUS WITH AN OPERATION MEMBER FOR A COVER OF A CONNECTOR

(75) Inventors: Tomoyuki Mito, Tokyo (JP); Nobutatsu Takahashi, Tokyo (JP); Hidetoshi Isawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 435 days.

(21) Appl. No.: 11/774,715

(22) Filed: Jul. 9, 2007

(65) Prior Publication Data

US 2008/0180567 A1    Jul. 31, 2008

(30) Foreign Application Priority Data

Jul. 14, 2006    (JP) .................................. 2006-194100

(51) Int. Cl.
*H04N 5/225* (2006.01)
(52) U.S. Cl. .............. 348/373; 348/333.06; 348/333.07; 348/374; 348/375; 348/376
(58) Field of Classification Search ............. 348/333.06, 348/333.07, 373–376
See application file for complete search history.

(56) References Cited

U.S. PATENT DOCUMENTS

| | | | | |
|---|---|---|---|---|
| 5,243,453 A * | 9/1993 | Kawaguchi et al. | ............ | 349/60 |
| 6,315,144 B1 * | 11/2001 | Foltz | ............................ | 220/86.2 |
| 2004/0264955 A1 * | 12/2004 | Fujii | ............................ | 396/448 |
| 2005/0200739 A1 * | 9/2005 | Ahn | ......................... | 348/333.06 |

FOREIGN PATENT DOCUMENTS

| | | |
|---|---|---|
| JP | 2003-298897 | 10/2003 |
| JP | 2003-333394 | 11/2003 |
| JP | 2005-184669 | 7/2005 |
| JP | 2005-260958 | 9/2005 |

* cited by examiner

*Primary Examiner* — Jason Chan
*Assistant Examiner* — Usman Khan
(74) *Attorney, Agent, or Firm* — SNR Denton US LLP

(57) ABSTRACT

An image capture apparatus includes a housing body, an image capture optical system, an image capture device, a connector, a cover, and an operation member. The display panel is provided to the housing body to be pivotable between a usage position where a display surface of the display panel is visible and a storage position where the display surface of the display panel is in contact with a surface of the housing body. The cover opens or closes the insertion/removal opening by extending or retracting on the insertion/removal opening from an interior of the housing body. The operation member is provided to the housing body, and is operated to move the cover along a direction of opening or closing the insertion/removal opening, the operation member being provided to the housing body.

9 Claims, 31 Drawing Sheets

FIG.22A
FIG.22B
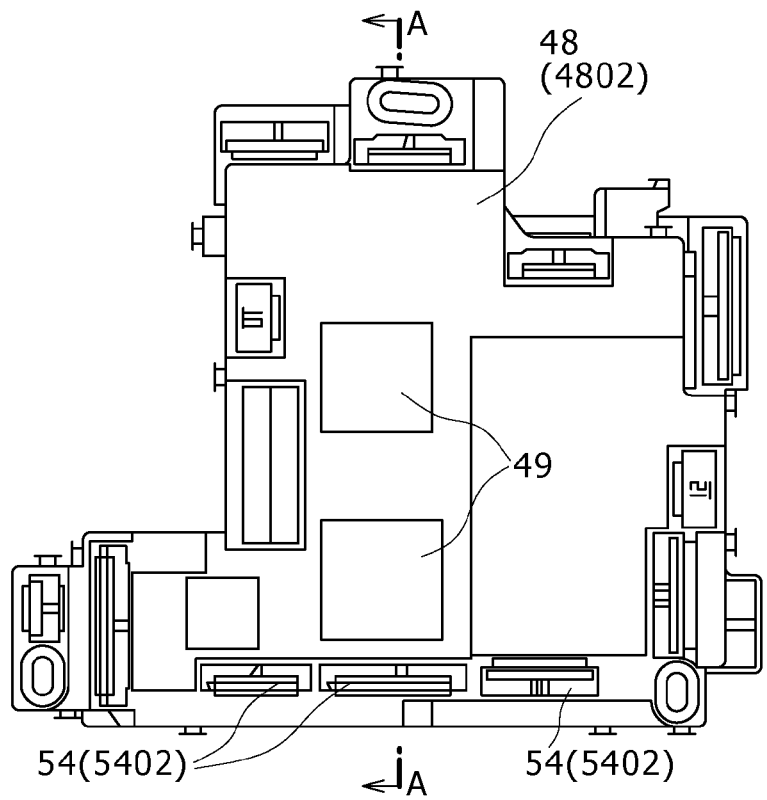
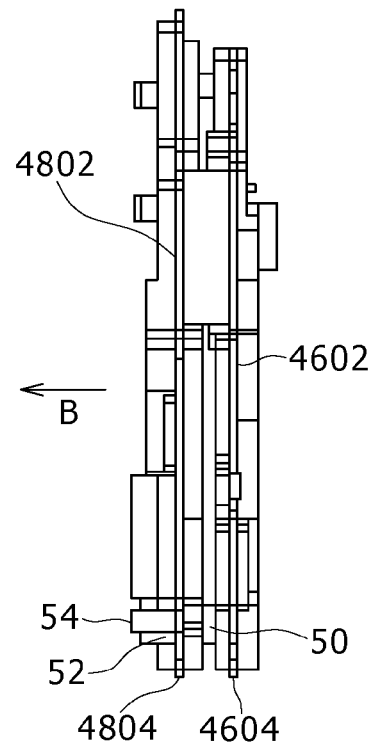
FIG.22C
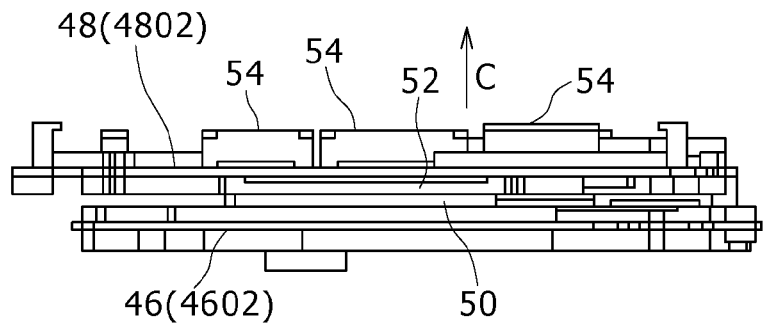

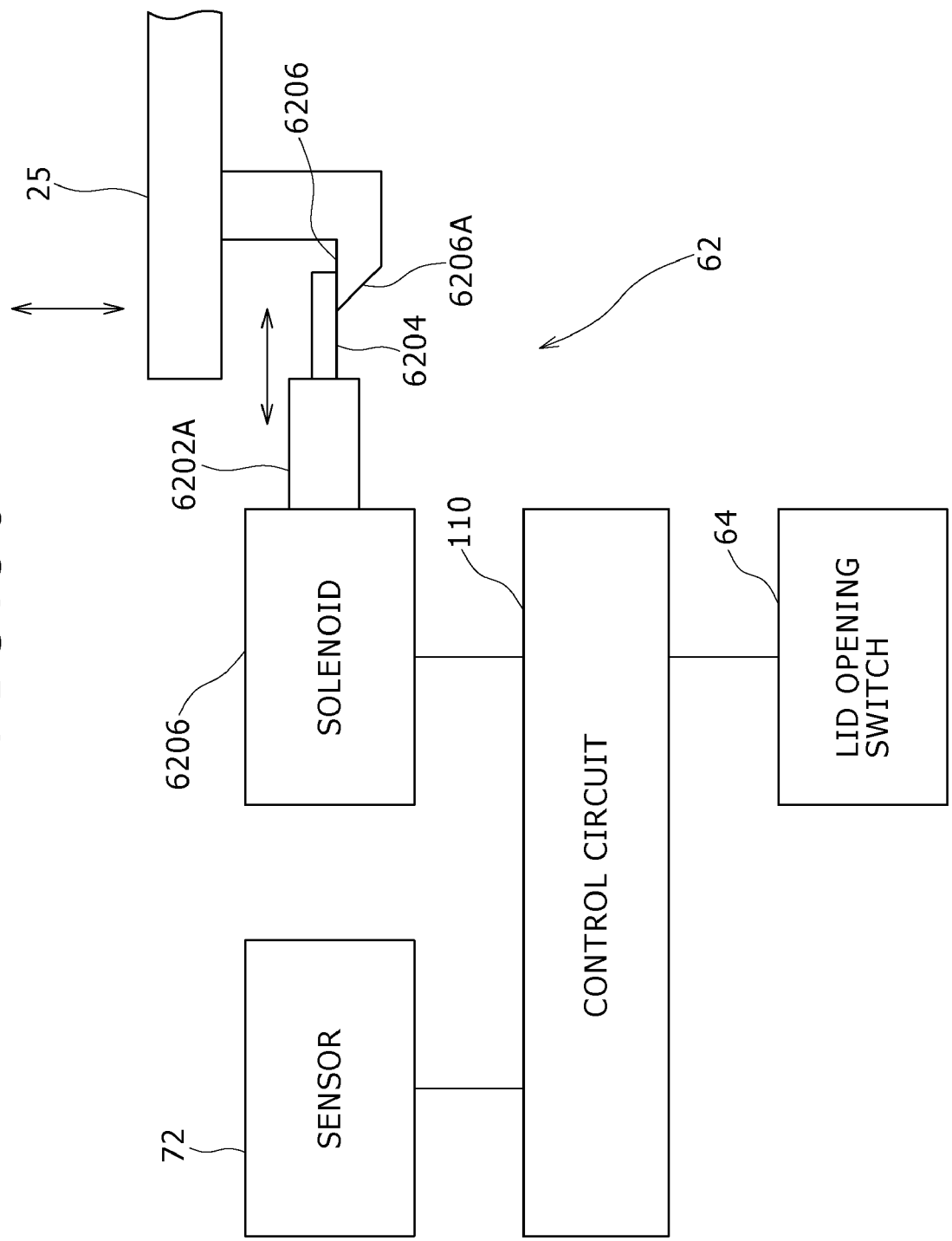

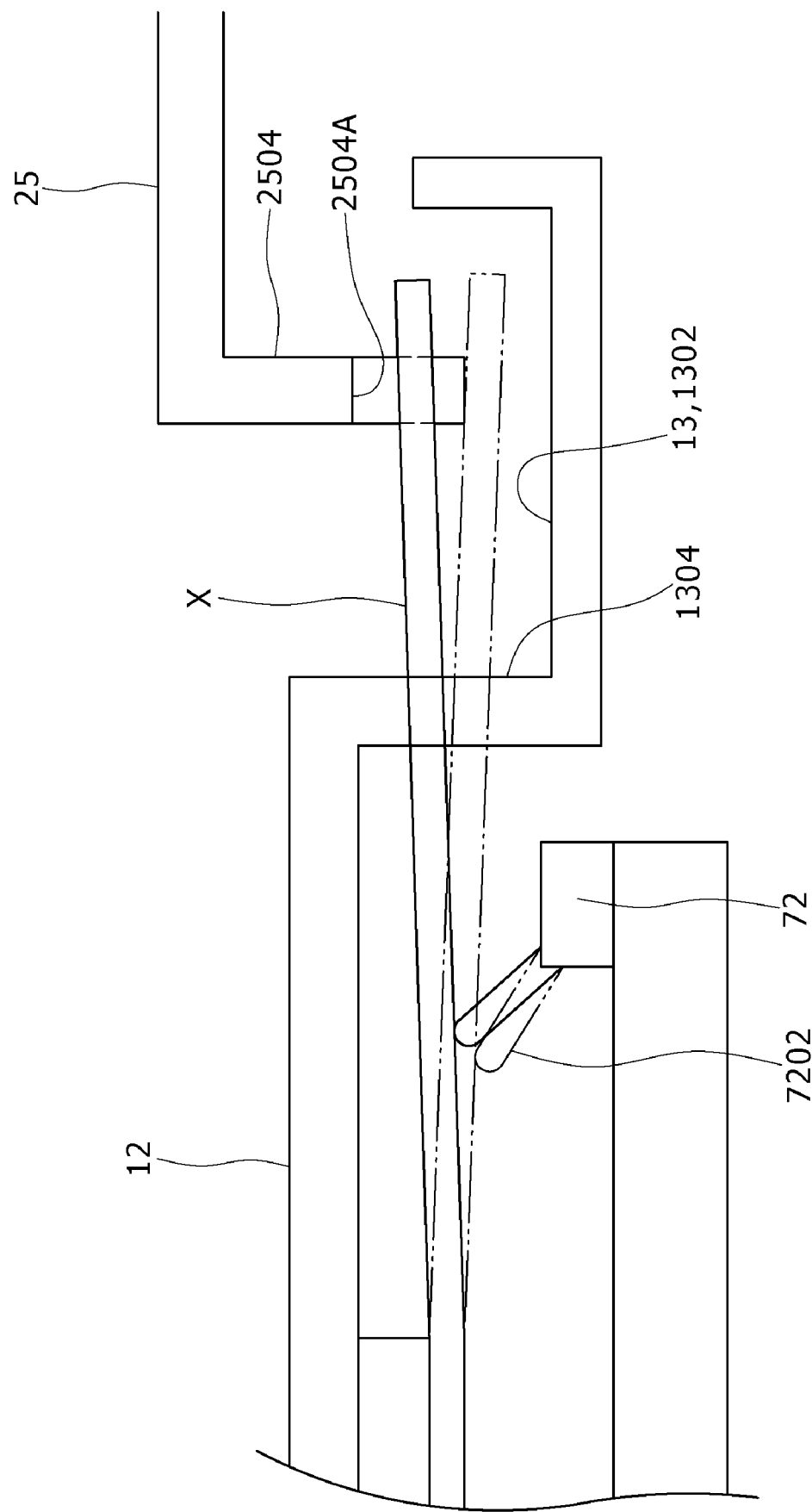

IMAGE CAPTURE APPARATUS WITH AN OPERATION MEMBER FOR A COVER OF A CONNECTOR

The present invention contains subject matter related to Japanese Patent Application JP 2006-194100 filed in the Japanese Patent Office on Jul. 14, 2006, the entire contents of which being incorporated herein by reference.

BACKGROUND OF THE INVENTION

1. Field of the Invention

The present invention relates to an image capture apparatus.

2. Description of the Related Art

In many cases, image capture apparatuses, such as video cameras, have electrical connectors (simply "connectors," hereinbelow) for connecting cables to external devices, such as a television device and a computer, for communication of signals, such as audio and video signals.

According to a previously proposed technique (see Patent Publication 1 (Japanese Unexamined Patent Application Publication No. 2005-184669)), an apparatus such as described above has a cover for protecting connectors on two sides from foreign matter such as dust. As seen from the publication, the cover is engageable and disengageable with cover receiving portions of the connectors. In substantially the center, the cover has a cover-fitting piece (which also serve to prevent missing of the cover) protruding therefrom that mates with a receiving opening provided on the side of the apparatus, and the cover is pivotable about the cover-fitting piece. The cover is formed into a slender planar shape from resilient synthetic resin or rubber, and is engageable or disengageable from the cover receiving portions of the connectors by being held using a user's digit(s) (finger(s)).

However, the operation for engagement or disengagement of the cover with the cover-receiving portion(s) of the connector(s) is intricate. Further, in the state that the cover is disengaged from the cover-receiving portions of the connectors, the cover is situated in a loose or dangling state in the outside of the housing body. The cover in such the state hinders the operation of connecting a cable connector(s) to the apparatus-side connector(s). Further, such the state of the cover is disadvantageous in the exterior of the apparatus.

SUMMARY OF THE INVENTION

In view of the above, it would be desirable to provide an image capture apparatus advantageous for improving operability in a connector insertion/removal operation.

According to an embodiment of the present invention, an image capture apparatus includes a housing body constituting an exterior; an image capture optical system for guiding an image of a subject into an interior of the housing body; an image capture device for capturing the image guided by the image capture optical system; a display panel for displaying the image captured by the image capture device, the display panel being provided to the housing body to be pivotable between a usage position where a display surface of the display panel is visible and a storage position where the display surface of the display panel is in contact with a surface of the housing body; a connector for connection to an external device, the connector being built-in in the housing body and having an insertion/removal opening exposed on a surface of the housing body, wherein the insertion/removal opening is provided in a portion of the housing body, which portion is exposed on an outer side of the display panel in a state that the display panel is positioned in the storage position; a cover for opening or closing the insertion/removal opening by extending or retracting on the insertion/removal opening from an interior of the housing body; and an operation member for moving the cover along a direction of opening or closing the insertion/removal opening, the operation member being provided to the housing body.

According to the embodiment of the present invention, the insertion/removal opening of the connector can easily be opened and closed by the cover by operating the operation member. This is advantageous to improve the operability.

Further, when the cover is positioned in the opened position, the cover is stored in the housing body. Consequently, the cover does not hinder the insertion or removal operation for connection or disconnection between the connector on the image capture apparatus and a cable connector. This is advantageous to improve the operability in the event of the insertion or removal operation for connection or disconnection between the connectors.

Further, when the cover is positioned in the closed position, the cover and the housing body form an integral exterior. On the other hand, when the cover is positioned in the opened position, the cover is not situated in a loose or dangling state in the outside of the housing body. This is advantageous to improve the design function.

BRIEF DESCRIPTION OF THE DRAWINGS

FIG. 13 is a front view as viewed from the inside of the housing body in a state where an operation member and a cover are built-in;

FIG. 17 is a front view as viewed from the inside of the housing body in a state where the operation member and the cover are built-in;

FIG. 22A is a plan view of the first and second printed circuit boards, FIG. 22B is a view taken from the direction indicated by the arrow B of FIG. 22A, and FIG. 22C is a view taken from the direction indicated by the arrow C of FIG. 22A;

FIG. 30 is a block diagram of a control system relevant to the detecting mechanism for and a lock mechanism of the opening/closing lid; and FIG. 31 is an explanatory view of operation of a detecting mechanism of a comparative example.

DETAILED DESCRIPTION OF THE PREFERRED EMBODIMENT

An embodiment of the present invention will be described below with reference to the accompanying drawings.

Figure 1:
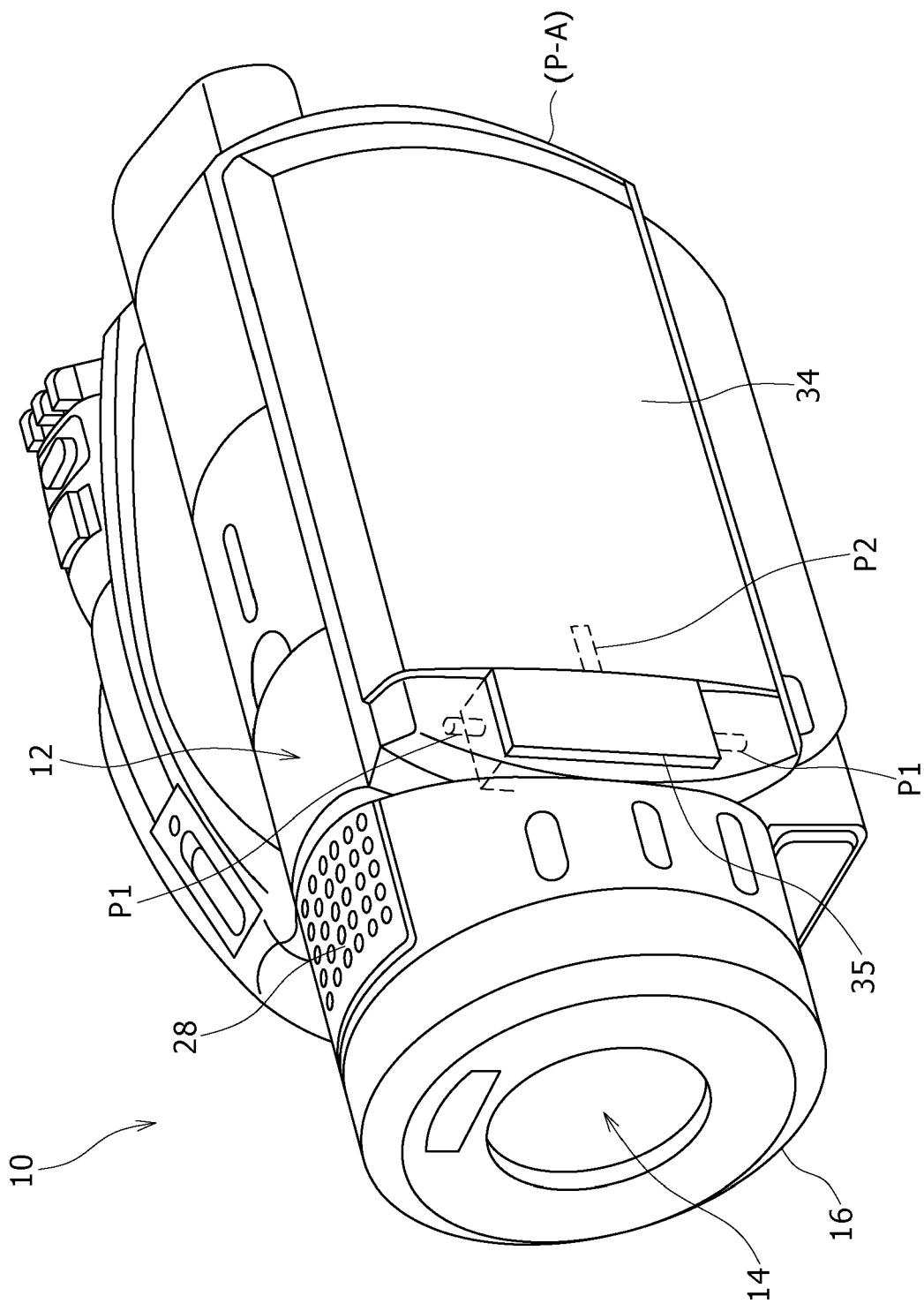
FIG. 1 is a perspective view showing the configuration of an image capture apparatus of an embodiment of the present invention.
Figure 2:
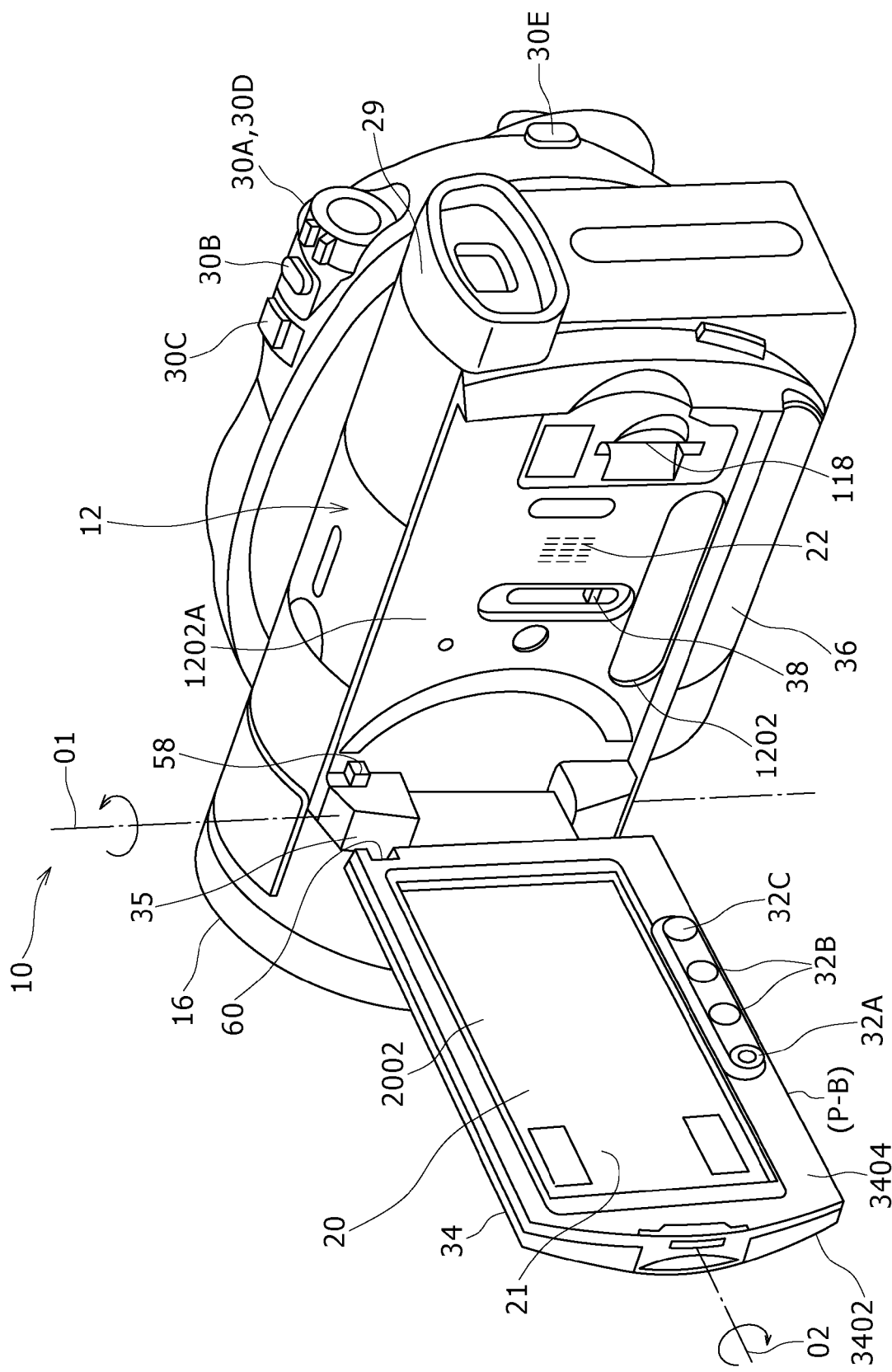
FIG. 2 is a perspective view showing the configuration of the image capture apparatus of the embodiment.
Figure 3:
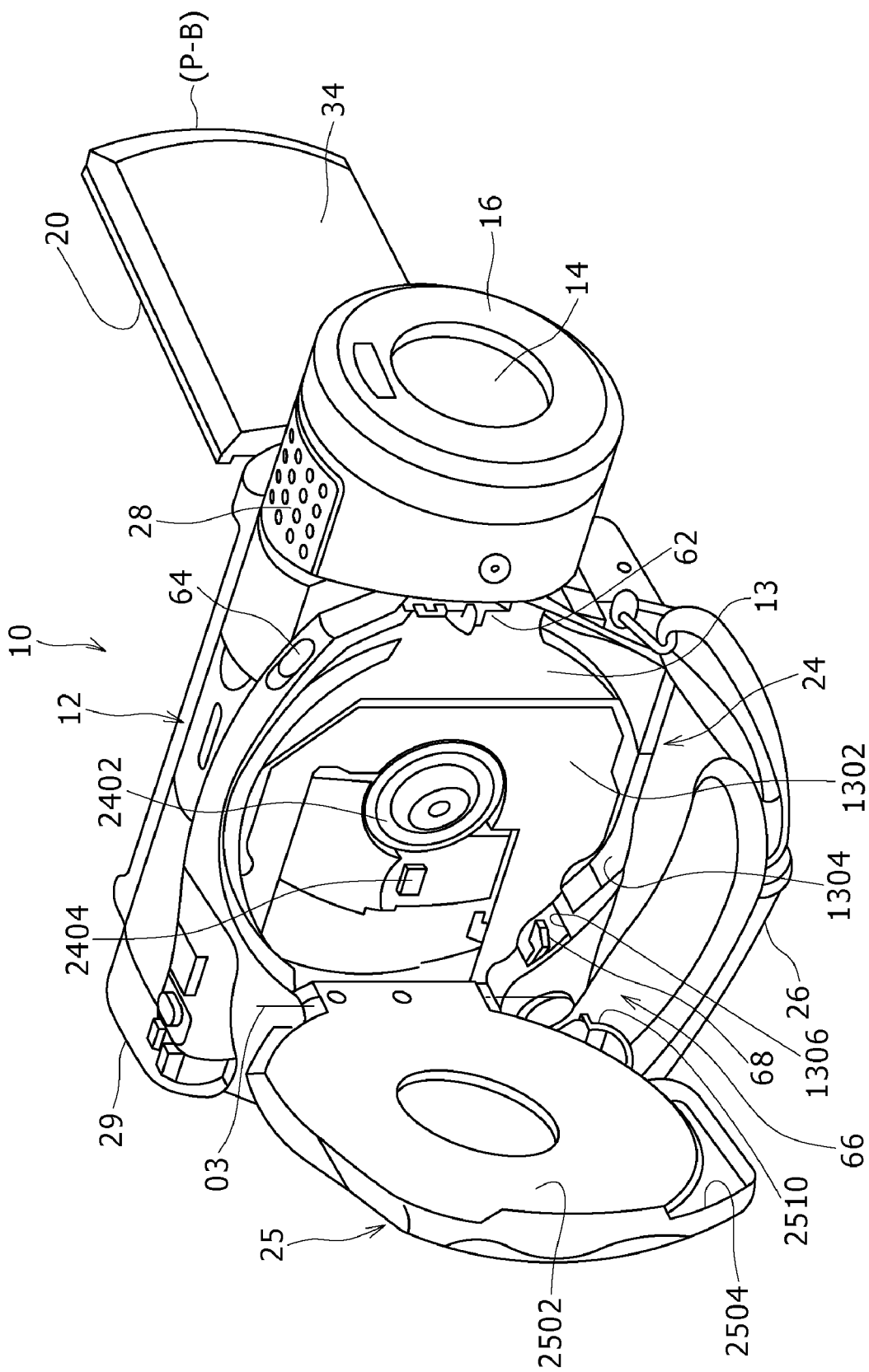
FIG. 3 is a perspective view showing the configuration of the image capture apparatus of the embodiment.
Figure 5:
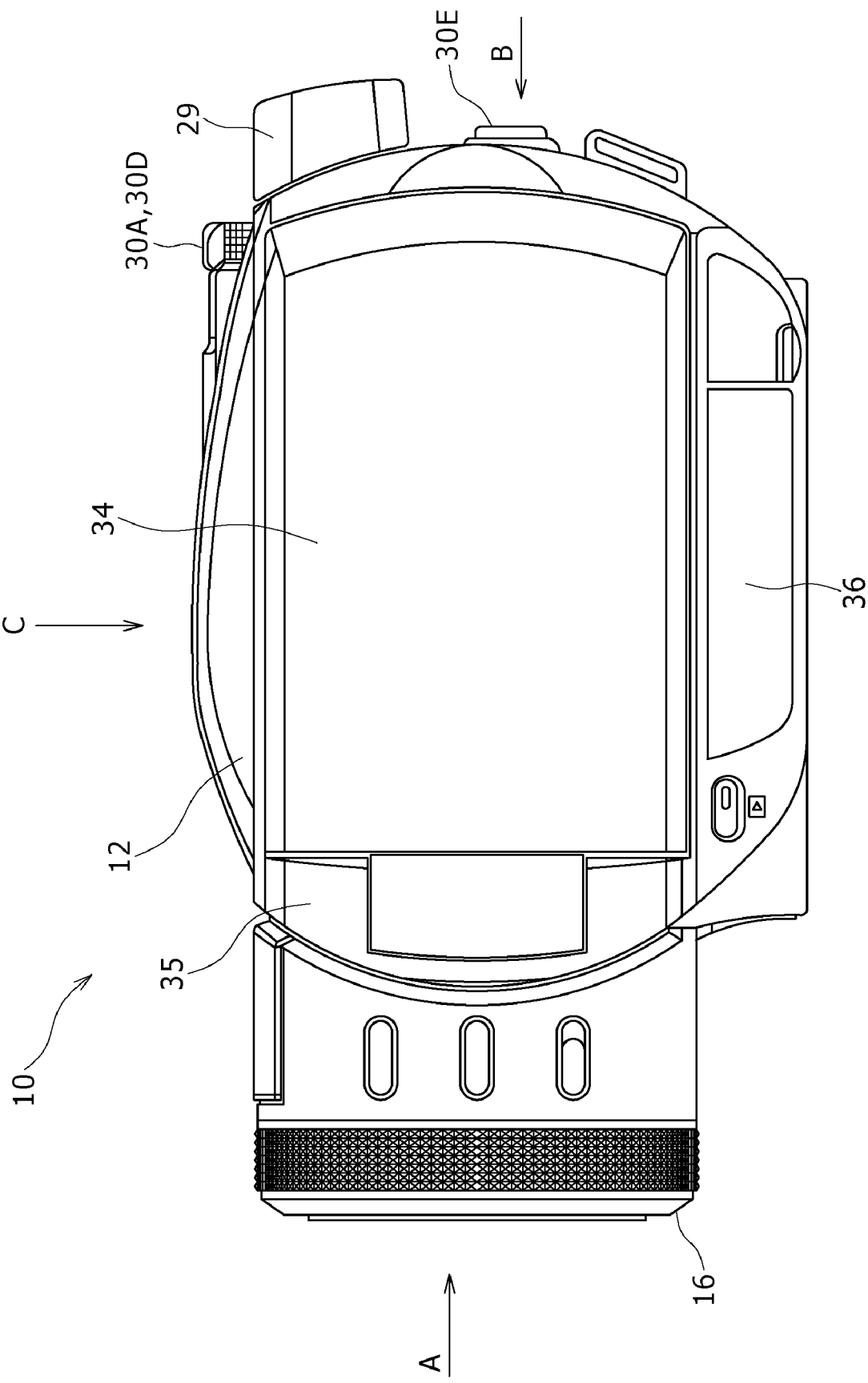
FIG. 5 is a left side view of the image capture apparatus of the embodiment.
Figure 6:
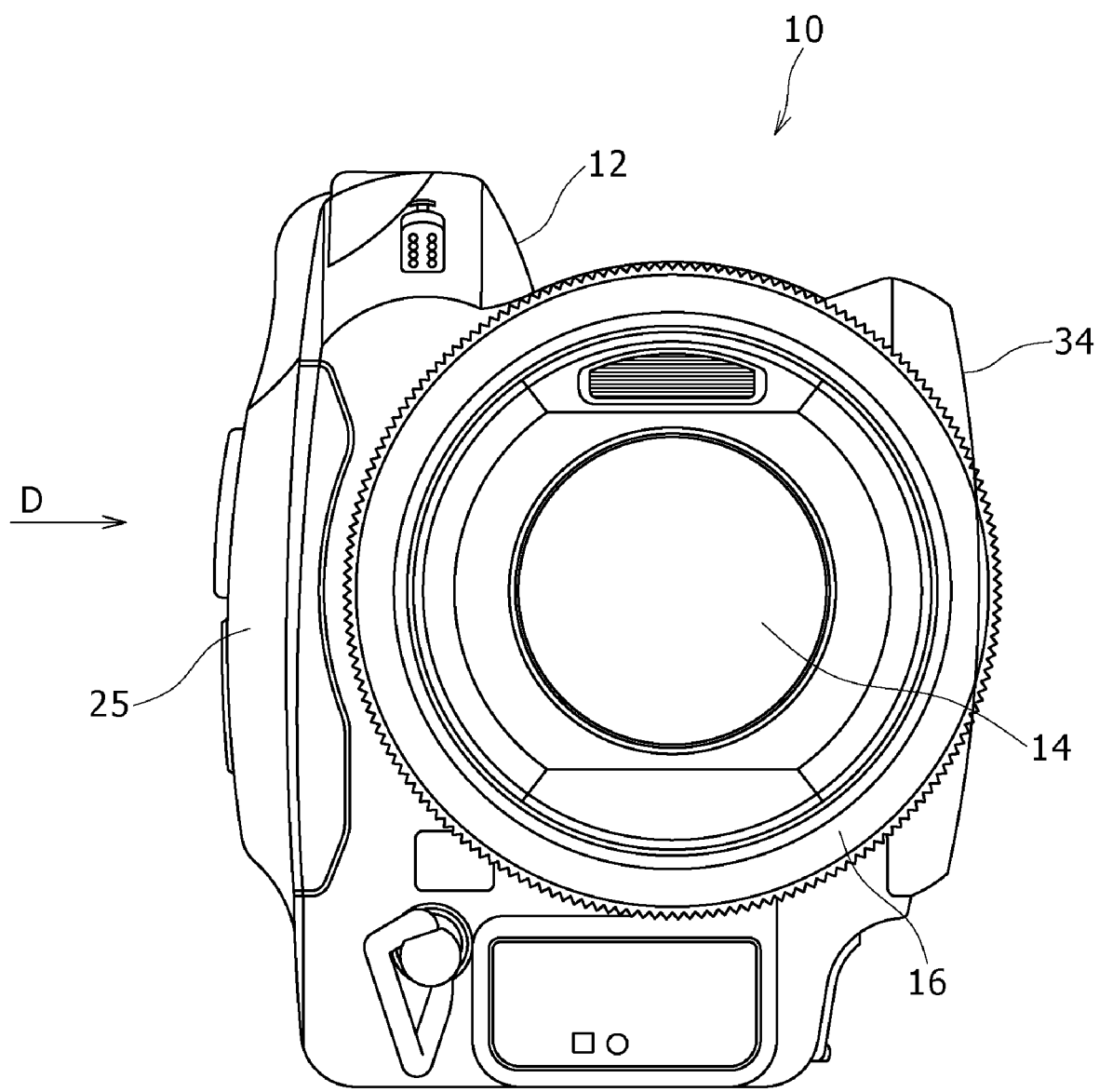
FIG. 6 is a view taken from the direction indicated by the arrow A of FIG. 5.
Figure 7:
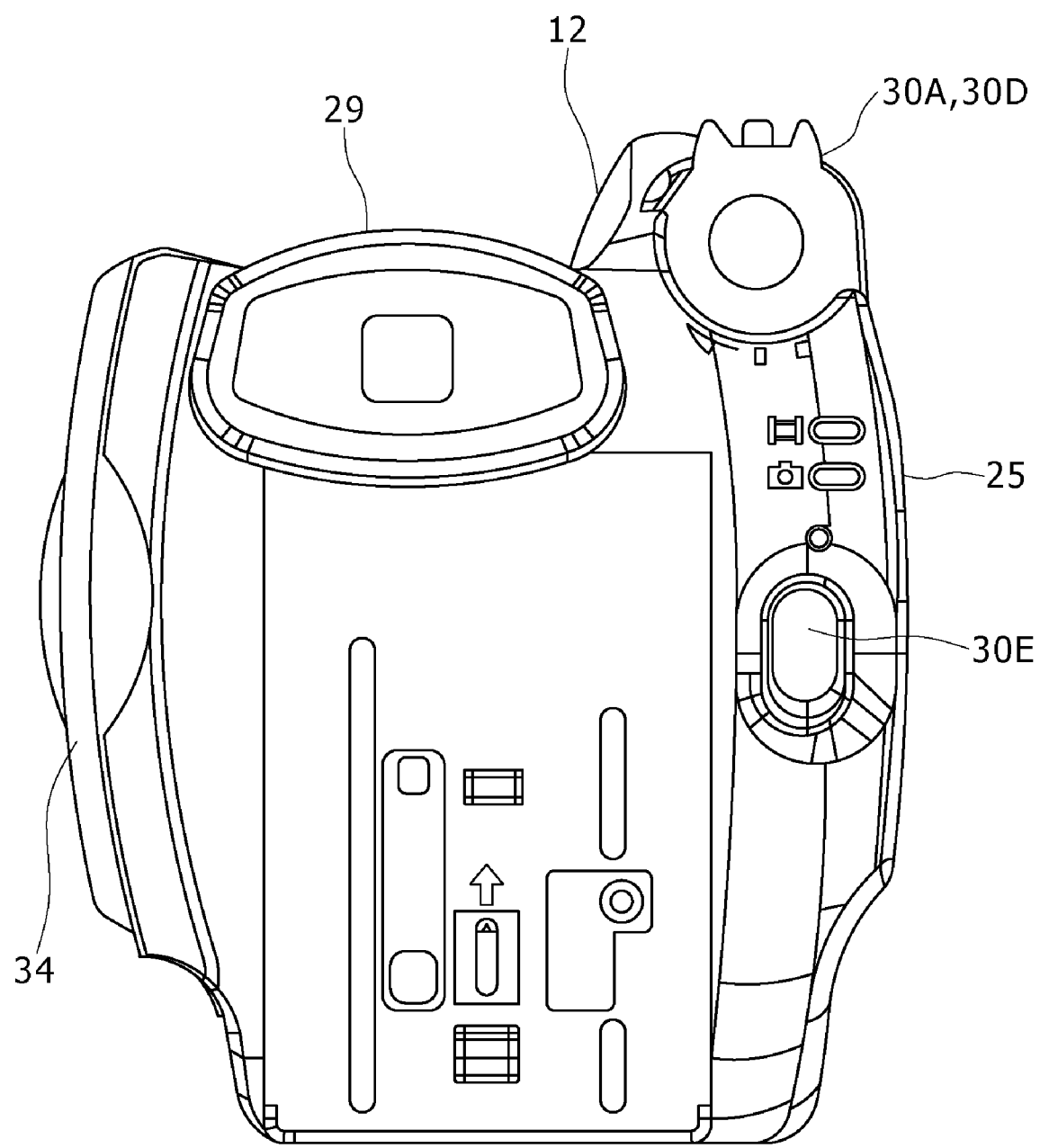
FIG. 7 is a view taken from the direction indicated by the arrow B of FIG. 5.
Figure 8:
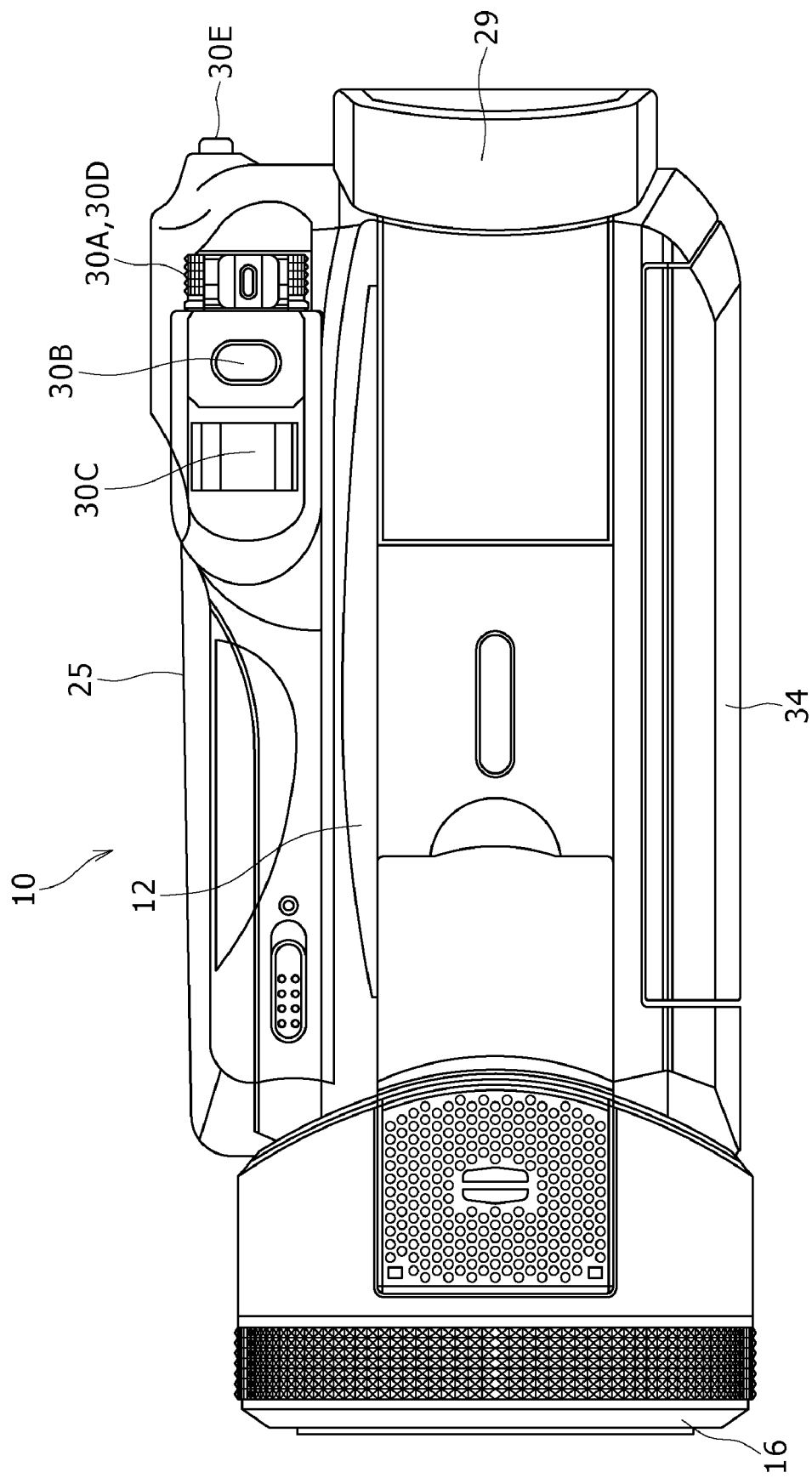
FIG. 8 is a view taken from the direction indicated by the arrow C of FIG. 5.
Figure 9:
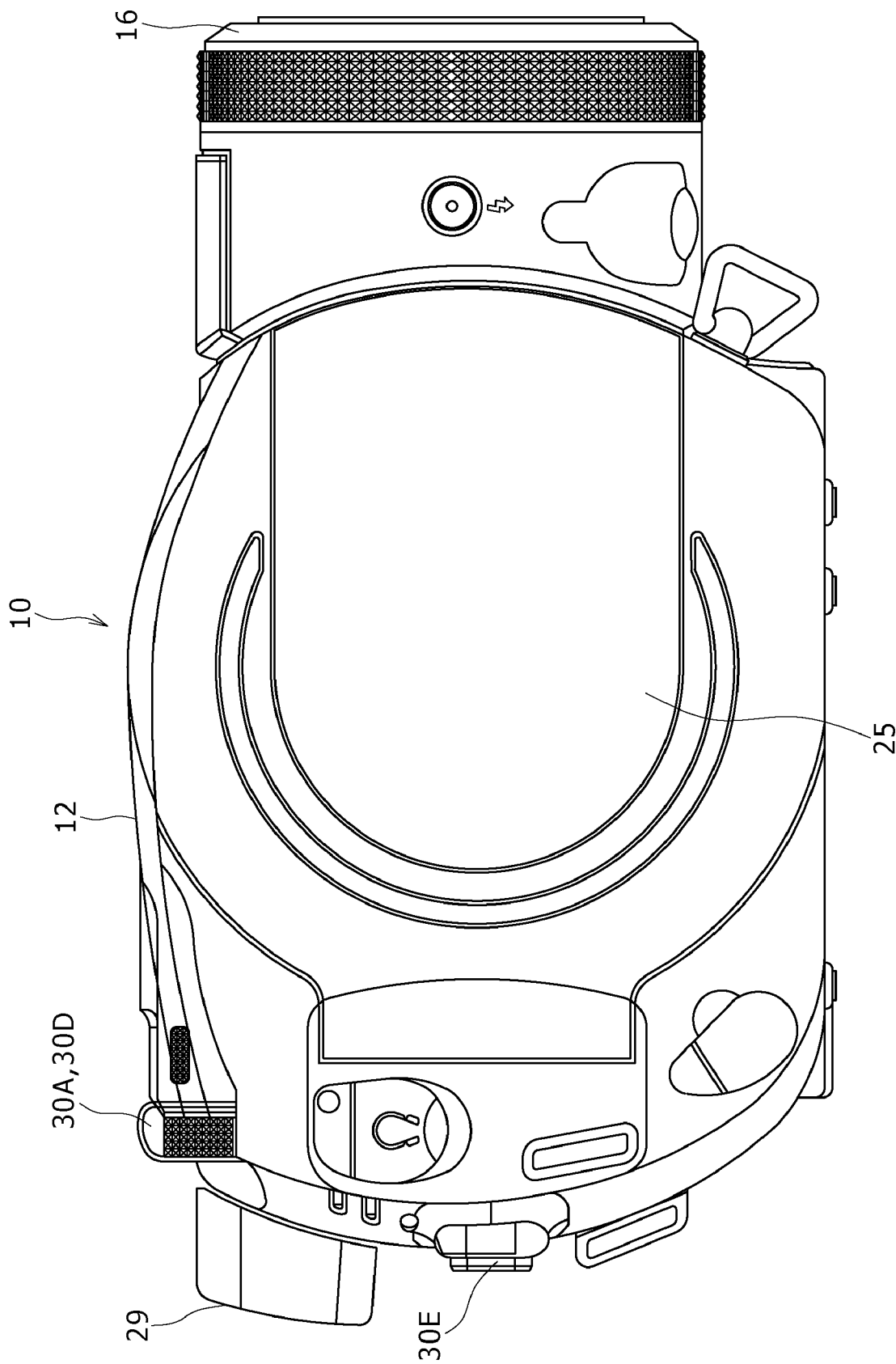
FIG. 9 is a view taken from the direction indicated by the arrow D of FIG. 6.

FIGS. 1 to 3, respectively, are perspective views showing the configuration of an image capture apparatus 10 of the embodiment. FIG. 5 is a left side view of the image capture apparatus 10 of the embodiment. FIGS. 6 to 8, respectively, are views taken from directions indicated by the arrows A to C of FIG. 5; and FIG. 9 is a view taken from a direction indicated by the arrow D of FIG. 6.

With reference to FIGS. 1 to 3 and 5 to 9, the image capture apparatus 10 of the present embodiment is a video camera that performs image capture in accordance with the HDTV (high-definition television) scheme, i.e., HDV standards.

A housing body 12 constituting the exterior of the image capture apparatus 10 has a length in a frontward-and-rearward direction and a height in an upward-downward direction (or, vertical direction) that are larger than a width in a left-and-right direction. Throughout the Specification, the "left" and "right" refer to the directions when the image capture device 10 is viewed from the rearward direction. In addition, the side of a subject along an optical axis direction of an optical system is referred to as "frontward direction," and the side of an image capture device on the optical axis direction is referred to as "rearward direction."

In a front portion of an upper portion of the housing body 12, a lens barrel 16 including a built-in image capture optical system 14 extends to oppose a front face of the housing body 12. An image of a subject is, therefore, guided from the front portion of the housing body 12 into the housing body 12.

An image capture device 18 (see FIG. 4) for capturing an image of a subject guided by the image capture optical system 14 is provided to a rear end of the lens barrel 16.

A display panel 20 is provided in a lefthand side portion of the housing body 12 to be openable or closable. The display panel 20 displays, for example, the image of the subject captured by the image capture device 18.

As shown in FIG. 3, a disk mounting portion 24 is provided on a righthand side portion of the housing body 12. The disk mounting portion 24 is used to removably mount a disk-like recording medium 2 (see FIG. 4) that records, for example, image data and audio data, and is opened and closed by an opening/closing lid 25. The opening/closing lid 25 is pivotably provided on a right lateral surface of the housing body 12. In FIG. 3, character O3 denotes a pivotal axis of the opening/closing lid 25.

The disk mounting portion 24 includes a recess portion 13 provided on the right lateral surface of the housing body 12 of the housing body 12.

The recess portion 13 includes a bottom face 1302 with a contour larger than the disk-like recording medium 2, and a lateral surface 1304 uprising from the bottom face 1302.

A chucking portion 2402 (turntable) is provided in a central portion of the bottom face 1302. The chucking portion 2402 is engaged/disengaged from a center hole of the disk-like recording medium 2, and is rotated by a spindle motor (not shown). An optical pickup 2404 is provided to the bottom face 1302. The optical pickup 2404 irradiates the disk-like recording medium 2 with a light beam through an opening of the bottom face 1302, whereby to perform recording and/or playback of signals (data) onto the disk-like recording medium 2.

The opening/closing lid 25 is locked or unlocked by a lock mechanism 62 (see FIG. 30), which is described further below. More specifically, the lid 25 is locked at a closed position closing the disk mounting portion 24, and is permitted to pivotally move from a closed position to an opened position upon being unlocked.

The opening/closing lid 25 includes a body plate portion 2502 opposing the disk mounting portion 24 at the closed position, and a circumferential plate portion 2504 curved from a peripheral edge of the body plate portion 2502. The lateral surface 1304 and the circumferential plate portion 2504 are moved to proximally oppose one another in the state that the opening/closing lid 25 is positioned in the closed position.

A grip belt 26 extending along the frontward-and-rearward direction is provided to the right lateral surface of the housing body 12. A microphone 28 for collecting speech or audio is provided on a front portion of the upper surface of the housing body 12. An electronic viewfinder 29 in which a display (panel) 2902 (see FIG. 4) is built-in is provided in a rear portion of the upper surface of the housing body 12.

With reference to FIG. 2, the housing body 12 of the image capture apparatus 10 has operation switches for execution of various functions relevant to the image capture. The switches include, for example, a power switch 30A, still image capturing switch 30B, zoom switch 30C, mode shift switch 30D, and motion image capturing switch 30E. The display panel 20 has a panel-side motion image capturing switch 32A, a panel-side zoom switch 32B, and a menu operation switch 32C. In addition, with reference to FIG. 3, a lid opening switch 64 is provided in a portion near to the disk mounting portion 24 on the upper surface of the housing body 12.

Figure 4:
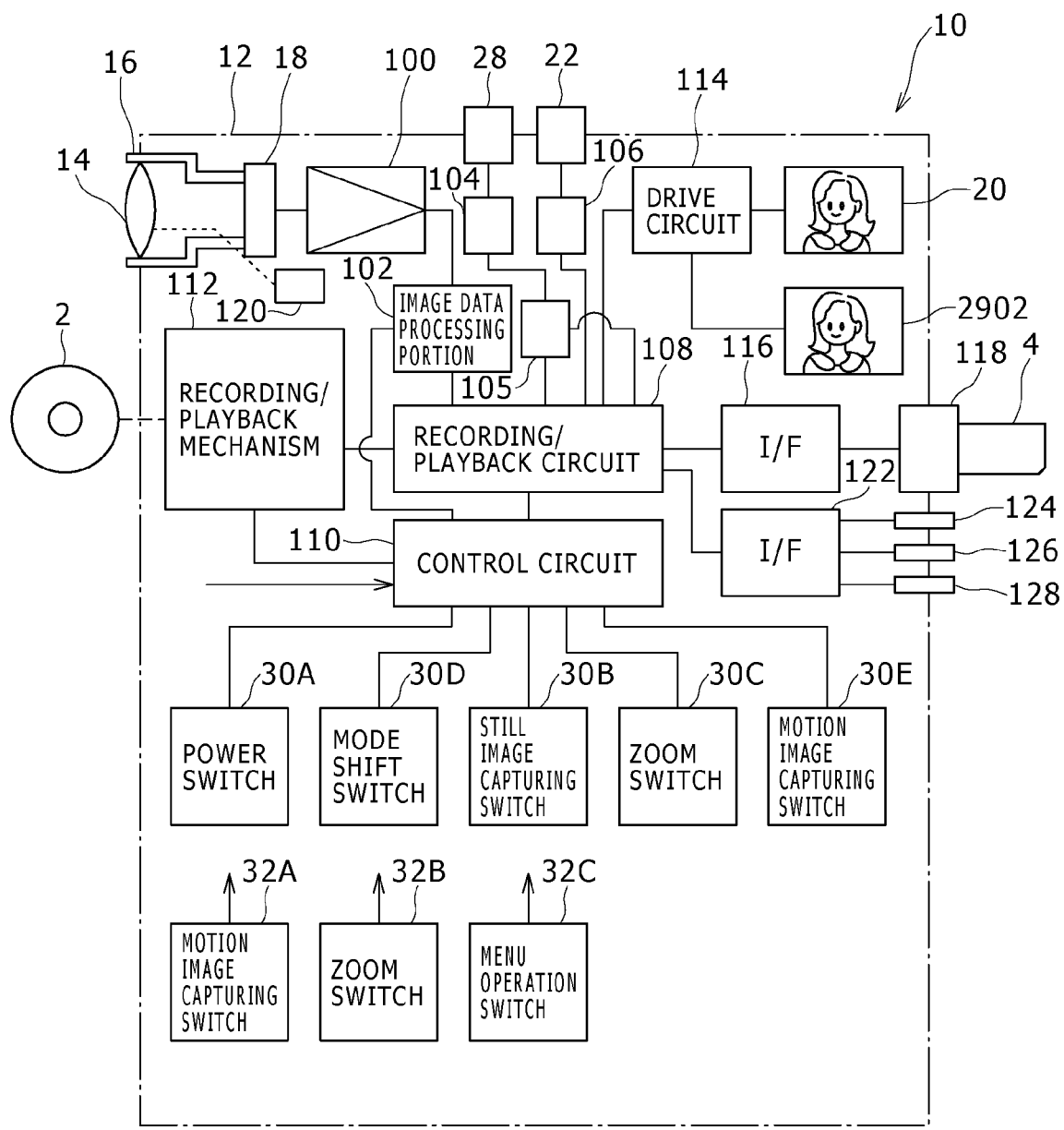
FIG. 4 is a block diagram of the configuration of a control system of the image capture apparatus of the embodiment.

FIG. 4 is a block diagram of the configuration of a control system of the image capture apparatus 10.

With reference to FIG. 4, the image capture apparatus 10 further includes an image signal amplifier circuit 100, an image data processing portion 102, a microphone amplifier circuit 104, an audio data processing circuit 105, a speaker 22, an output amplifier circuit 106, a recording/playback circuit 108, a control circuit 110, recording/playback mechanism 112, a drive circuit 114, an interface circuit 116, a memory card slot 118, a zoom drive portion 120, an interface circuit 122, and first to third connectors 124, 126, and 128.

The image signal amplifier circuit 100 amplifies an image-captured signal generated by the image capture device 18. The amplified signal is supplied to the image data processing portion 102.

The image data processing portion 102 performs a predetermined signal process(es) of the image-captured signal and generates motion image data and still image data. The generated data are supplied to the recording/playback circuit 108.

The microphone amplifier circuit 104 amplifies an audio signal collected by the microphone 28, and the audio data processing circuit 105 performs a predetermined signal process of the audio signal. The output signal therefrom is supplied as audio data to the recording/playback circuit 108.

Under control of the control circuit 110, the recording/playback circuit 108 supplies the recording/playback mechanism 112 with data, such as motion image data or still image data supplied from the image data processing portion 102 and/or audio data supplied from the audio data processing circuit 105. The recording/playback mechanism 112 records the motion/still image data and/or audio data on the recording medium, i.e., the disk-like recording medium 2. The recording/playback mechanism 112 includes the optical pickup 2404 and the spindle motor (not shown).

The present embodiment is described by way of example using any one of optical disks, such as DVD-R, DVD-RW, and DVD+RW disks, for the disk-like recording medium 2. However, any one of either other optical disks than the aforementioned optical disks or magnetooptical disks can of course be used for the disk-like recording medium 2.

The recording/playback circuit 108 records, for example, motion/still image data supplied from the image data processing portion 102 and/or audio data supplied from the audio data processing circuit 105, into a memory card 4, which is inserted into the memory card slot 118, through the interface circuit 116.

Further, the recording/playback circuit 108 operates to supply motion/still image data, which is supplied from the image data processing portion 102, to the display panels 20 and 2902 and to display an image of the data thereon through the drive circuit 114.

Further, the recording/playback circuit 108 operates to supply motion/still image data, which is supplied from the memory card 4 through the interface circuit 116, to the display panels 20 and 2902 and to display an image of the data thereon through the drive circuit 114. Concurrently, the recording/playback circuit 108 operates to supply audio data, which is supplied from the memory card 4 through the interface circuit 116, to the speaker 22 and to output audio of the data therefrom through the output amplifier circuit 106.

Further, the record recording/playback circuit 108 operates to supply motion/still image data played back by the recording/playback mechanism 112 from the disk-like recording medium 2 to the display panels 20 and 2902 and to display an image of the data thereon through the drive circuit 114. Concurrently, the recording/playback circuit 108 operates to supply audio data played back by the recording/playback mechanism 112 from the disk-like recording medium 2 to the speaker 22 and to output audio of the data through the output amplification circuit 106 therefrom.

The control circuit 110 operates for the power ON/OFF of the image capture device 10 in accordance with the operation of the power switch 30A.

In response to an operation of the still image capturing switch 30B, the control circuit 110 issues instructions to the image data processing portion 102 and the recording/playback circuit 108. In response, still image data supplied from the image data processing portion 102 is supplied to the recording/playback mechanism 112, and is recorded on the disk-like recording medium 2 through the recording/replaying circuit 108. Thus, the still image capturing switch 30B functions as a so-called "shutter button."

In response to an operation of the zoom switch 30C, the control circuit 110 issues an instruction to the zoom driving unit 68. In accordance with the instruction, the zoom drive portion 120 moves a movable lens of the image capture optical system 14, thereby to cause the zoom ratio of the image capture optical system 14 to change.

Further, in response to an operation of the mode shift switch 30D, the control circuit 110 issues an instruction to the image data processing portion 102, thereby to shift between a motion image capture mode and a still image capture mode. In the respective motion/still image capture mode, the image data processing portion 102 generates motion/still image data.

In the respective motion/still image capture mode, the motion/still image data generated by the image data processing portion 102 is recorded on either the disk-like recording medium 2 or memory card 4 through the recording/playback circuit 108.

Further, in response to an operation of the motion image capturing switch 30E, the control circuit 110 starts or stops recording of motion image data. More specifically, in response to an operation of the motion image capturing switch 30E, the control circuit 110 issues instructions to the image data processing portion 102 and the recording/playback circuit 108. Then, in accordance with the instructions, motion image data supplied from the image data processing portion 102 is supplied to the recording/playback mechanism 112 through the recording/replaying circuit 108. Thereby, the operation of recording the motion image data on the disk-like recording medium 2 is either started or stopped. Thus, the motion image capturing switch 30E functions as an image capture starting/stopping member.

The above-described panel-side motion image capturing switch 32A, panel-side zoom switch 32B, and menu operation switch 32C are connected to the control circuit 110. The panel-side motion image capturing switch 32A has a function similar to the motion image capturing switch 30E, and the panel-side zoom switch 32B has a function similar to the zoom switch 30C. The menu operation switch 32C is operated to directly return the level of a hierarchy of a menu being displayed on the display panel 20 to a highest level of the hierarchy.

The interface circuit 122 transforms audio data and image data played back by the recording/replaying circuit 108 into predetermined signal formats, and outputs the data to external devices through the first to third connectors 124, 126, and 128 provided for connection to the devices. The external devices are, for example, a television device, HDD recorder, and personal computer. In the present embodiment, the first connector 124 functions as a connector for outputting analog image and audio signals, the second connector 126 is a connector called a "D terminal" for outputting component image signals, and the third connector 128 is an HDMI standard connector (HDMI: High Definition Multimedia Interface).

Figure 10:
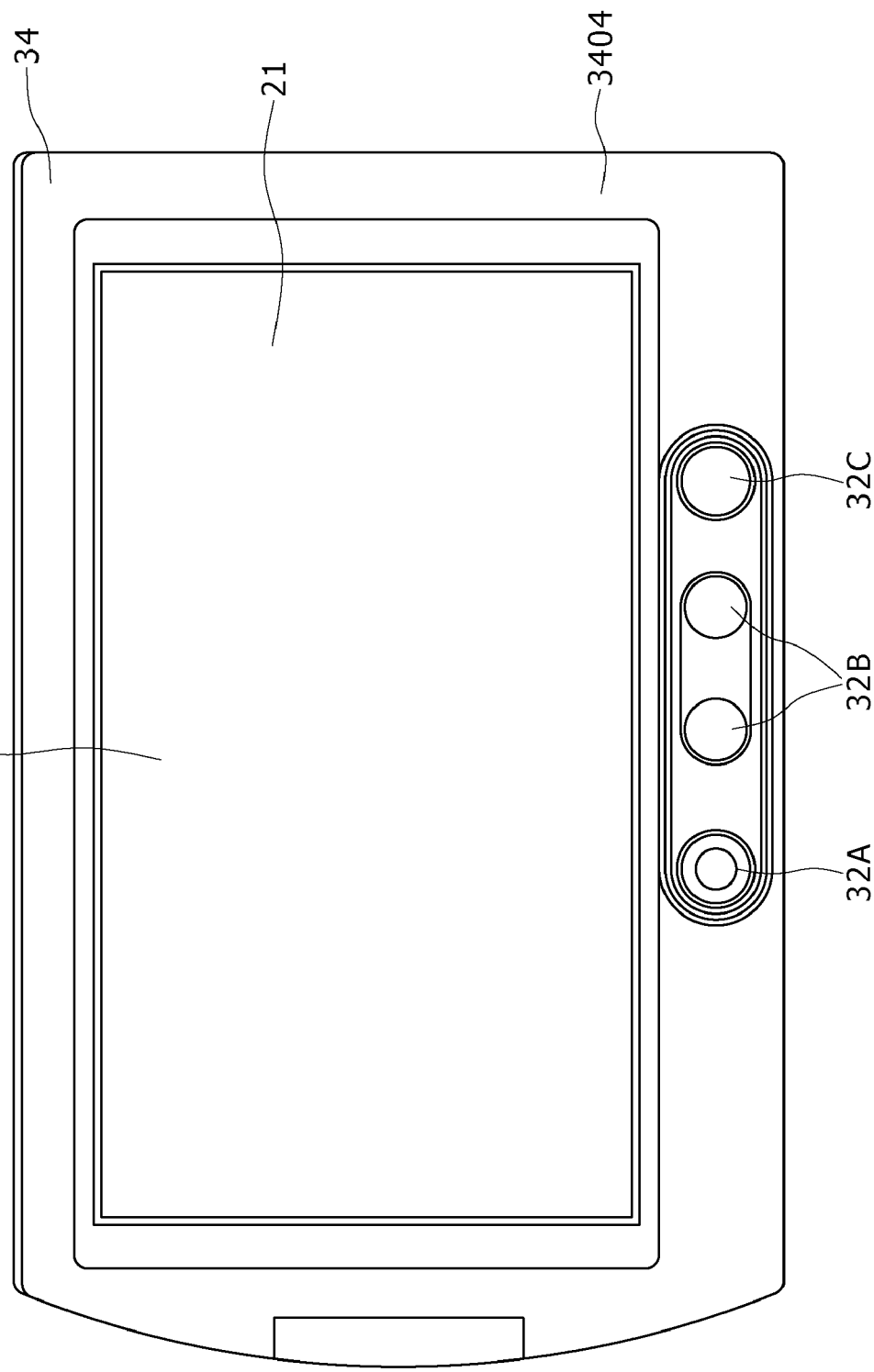
FIG. 10 is a plan view of a display panel of the image capture apparatus of the embodiment.

FIG. 10 is a plan view of the display panel 20.

With reference to FIG. 10, the display panel 20 is stored in a panel housing 34 having a rectangular plate-like shape.

The panel housing 34 has the rectangular plate-like shape that has a thickness, a width larger than the thickness, and a length larger than the width. A side portion positioned in a front end or an end portion of the panel housing 34 in the length direction is supported pivotably along the left-and-right direction through a hinge 35 about a front end (one end in the extension direction of the long side) as a fulcrum and is supported rotatably via a pivot (not shown).

The hinge 35 has first and second axes P1 and P2 (see FIG. 1) that connect between the housing body 12 and the panel housing 34.

More specifically, with reference to FIG. 2, the upper and lower portions of the front end of the panel housing 34 are supported pivotably (within an angular range of 90 degrees, which is an example range in the present embodiment) about a first axis P1 extending along the vertical direction of the image capture apparatus 10. In addition, a vertically central portion of the front end of the panel housing 34 is rotatably (within an angular range of 270 degrees, which is an example range in the present embodiment) about a second axis P2 extending perpendicular to the first axis P1 and along the horizontal direction of the image capture apparatus 10. Symbols O1 and O2 represent axis centers of the first and second axes P1 and P2, respectively.

Figure 26:
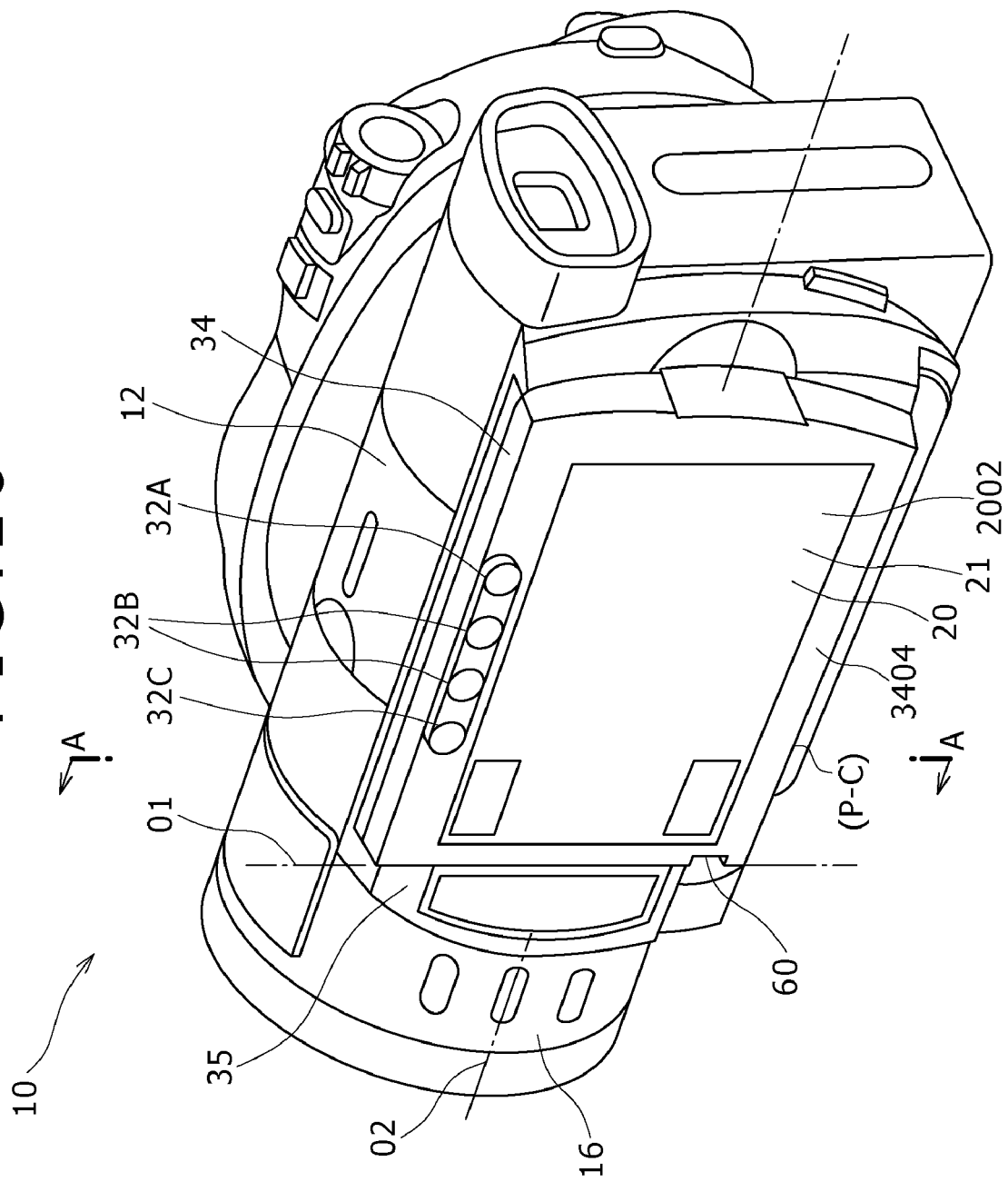
FIG. 26 is a perspective view of the image capture apparatus in which the display panel is set to a second usage position.

The panel housing 34 includes an outer face 3402 and an inner face 3404. The inner face 3404 has a rectangular frame shape surrounding the periphery of a display surface 2002. Operation members relevant to the image capture are disposed on the inner face 3404. More specifically, the operation members are the panel-side motion image capturing switch 32A, panel-side zoom switch 32B, and menu operation switch 32C. As shown in FIG. 2, the switches 32A, 32B, and 32C are disposed on the lower long side. As shown in FIG. 26, the switches 32A, 32B, and 32C are located in an upper portion of the display panel 20 in a second usage position described further below.

The outer face 3402 is positioned opposite the inner face 3404, and a cross section of the outer face 3402 taken along a plane perpendicular to a virtual extension line of the axis center O2 of the second axis P2 is an arcuate face. More specifically, the arcuate face is substantially a cylindrical face formed around the center corresponding to a virtual axis parallel to the axis center O2.

The outer face 3402 extends over a surface continual to a lateral surface portion about the periphery of a storage recess portion 1202 in the state that the panel housing 34 is positioned in a below-described storage position (AP) (see FIG. 1).

The panel housing 34 is movable across the aforementioned storage position (p-a), a first usage position (p-b), and a second usage position (p-c).

More specifically, when pivotally moved about the first axis P1, the panel housing 34 is positioned in the storage position (p-a). In the storage position (p-a), the panel housing 34 is closed against the housing body 12 and the display surface 2002 is in close proximity to the bottom face 1202A (storage face) of the storage recess portion 1202, described further below, of the storage recess portion 1202 of the housing body 12.

In addition, when pivotally moved about the first axis P1 from the storage position (p-a), the panel housing 34 is opened with respect to the housing body 12. Thereby, the panel housing 34 is positioned in the first usage position (p-b) in which the display surface 2002 is visible (see FIGS. 2 and 3).

In the first usage position (p-b), when rotated 180 degrees about the second axis P2 and pivotally moved about the first axis P1, the panel housing 34 is closed against the housing body 12. Thereby, the panel housing 34 is positioned in the second usage position (p-c) in which the outer face 3402 is positioned close proximity to the bottom face 1202A, and the display surface 2002 is visible. Thus, the display surface 2002 is visible in the respective first and second usage positions (p-b) and (p-c).

With reference to FIG. 2, the storage recess portion 1202 is provided on the left lateral surface of the housing body 12. In addition, the bottom face 1202A of the storage recess portion 1202 constitutes a portion of the left lateral surface of the housing body 12.

In the respective storage position (p-a) and second usage position (p-c), the panel housing 34 is stored in the storage recess portion 1202. In the storage position (p-a), the display surface 2002 of the display panel 20 opposes the bottom face 1202A of the storage recess portion 1202. In the second usage position (p-c), the outer face 3402 of the panel housing 34 opposes the bottom face 1202A of the storage recess portion 1202.

The panel-side motion image capturing switch 32A, the panel-side zoom switch 32B, and the menu operation switch 32C are disposed along the lower long side of the rectangular-frame shaped inner face 3404 of the panel housing 34.

Further, a touchpanel 21 is provided on the display surface 2002 of the display panel 20. More specifically, the touchpanel 21 is connected to the control circuit 110. When a portion of the touchpanel 21 corresponding to an icon displayed on the display surface 2002 is touched by a finger or stylus, an operation signal is input into the control circuit 110. Thereby, various operations can be performed.

As shown in FIG. 2, the speaker 22, the memory card slot 118, and the like components are provided on the bottom face 1202A of the storage recess portion 1202. These components are hidden by the display panel 20 in the storage position (p-a).

Figure 11:
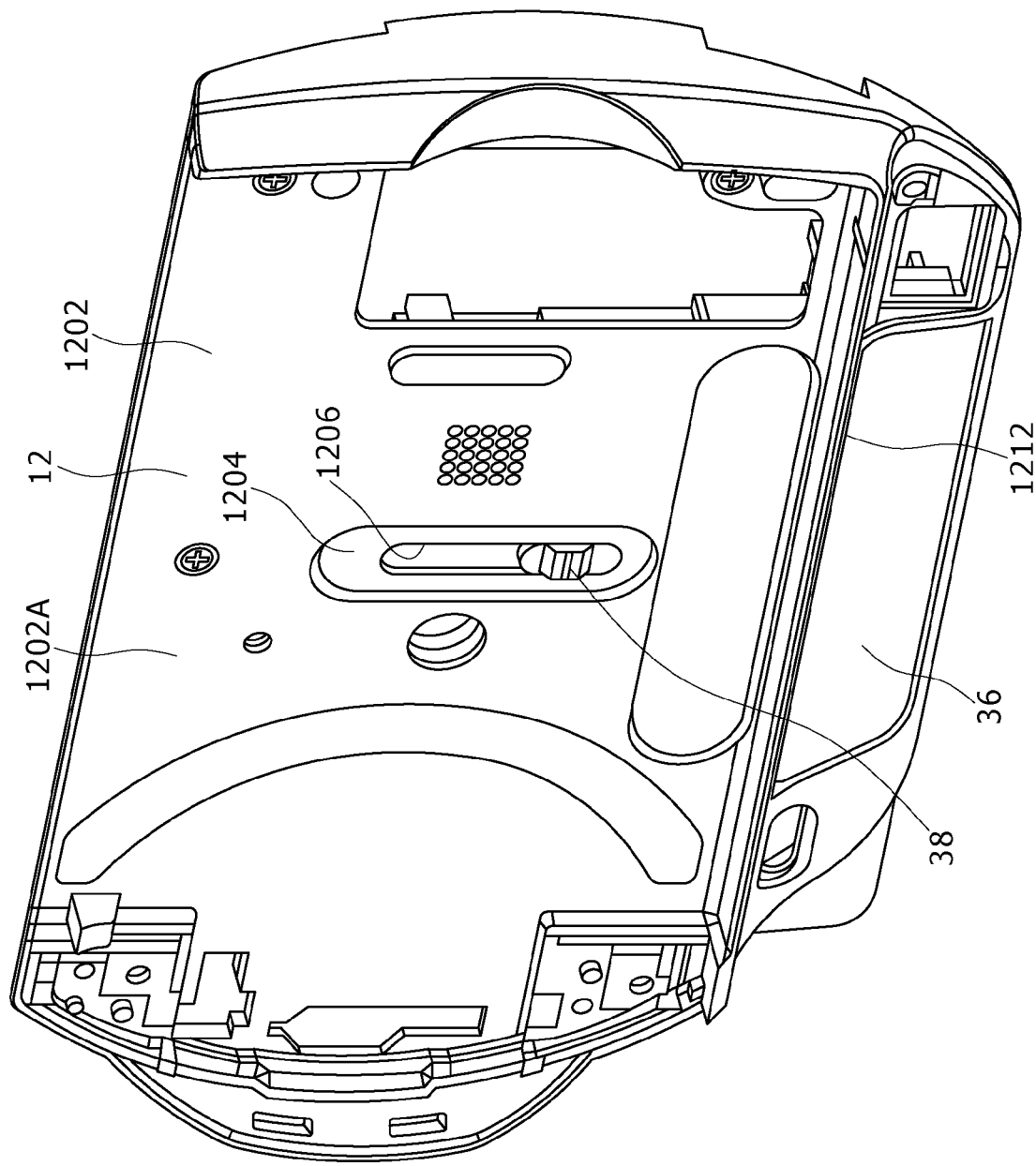
FIG. 11 is a perspective view of a storage recess portion of the image capture apparatus of the embodiment.
Figure 12:
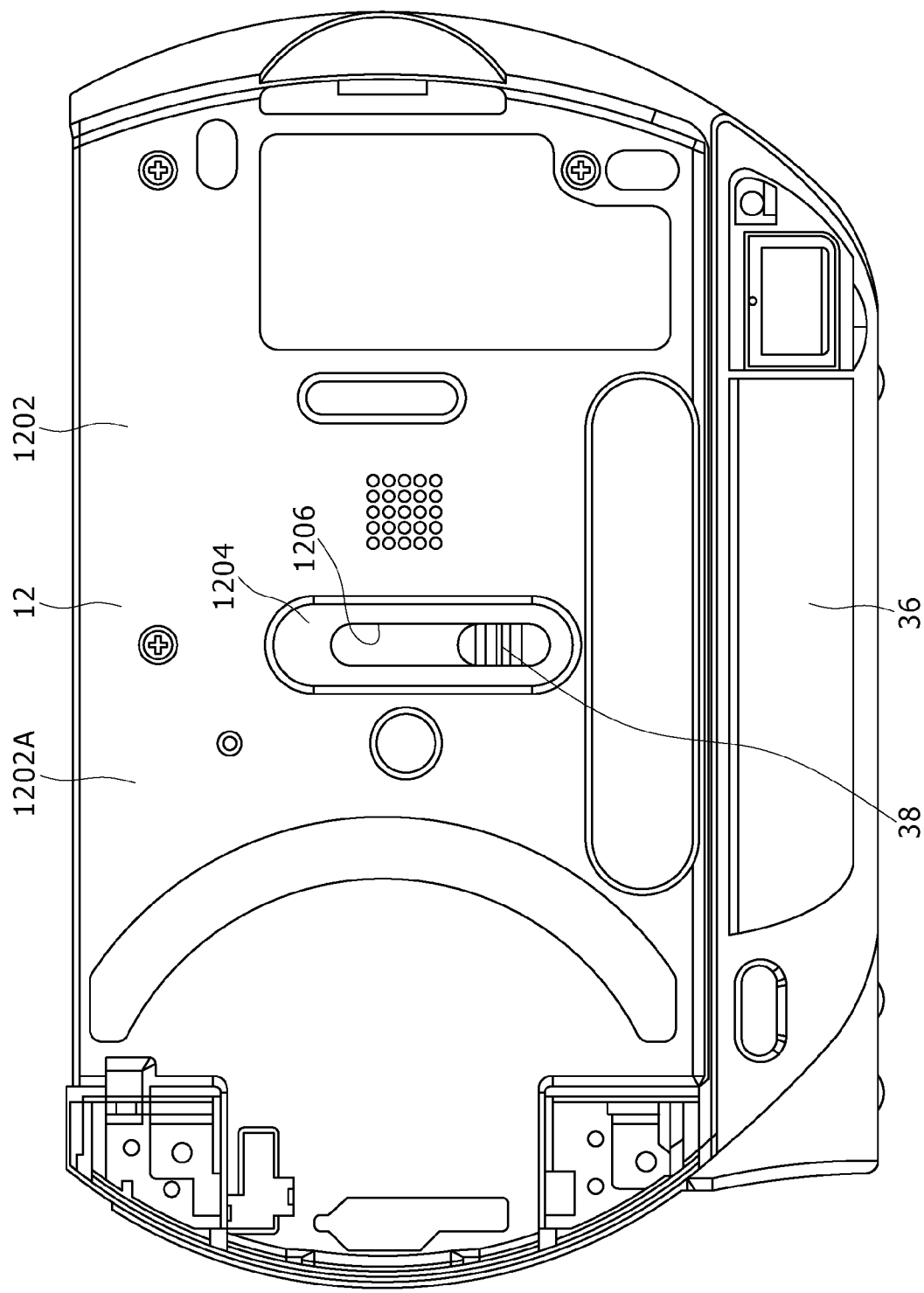
FIG. 12 is a front view of FIG. 11.
Figure 13:
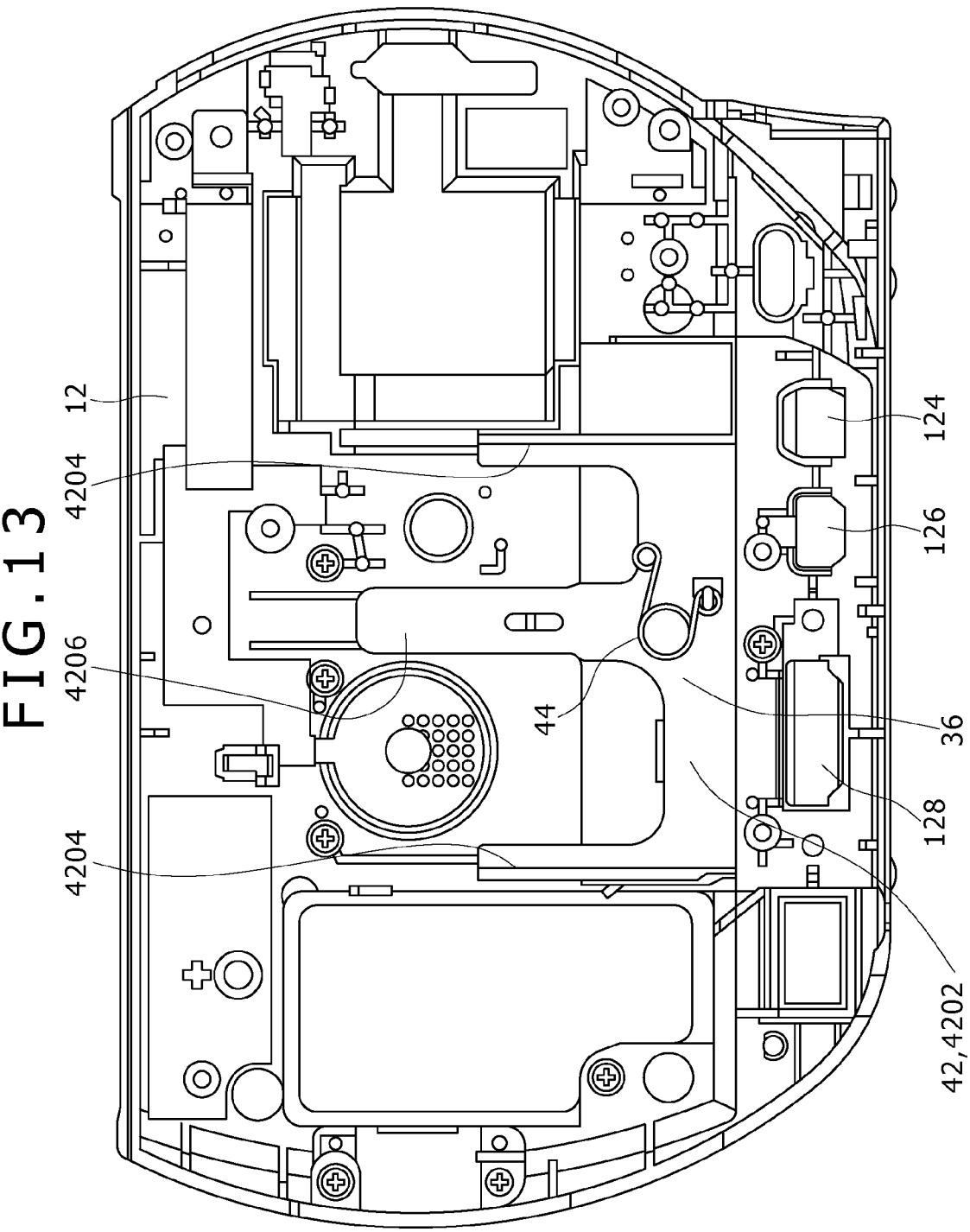
Figure 14:
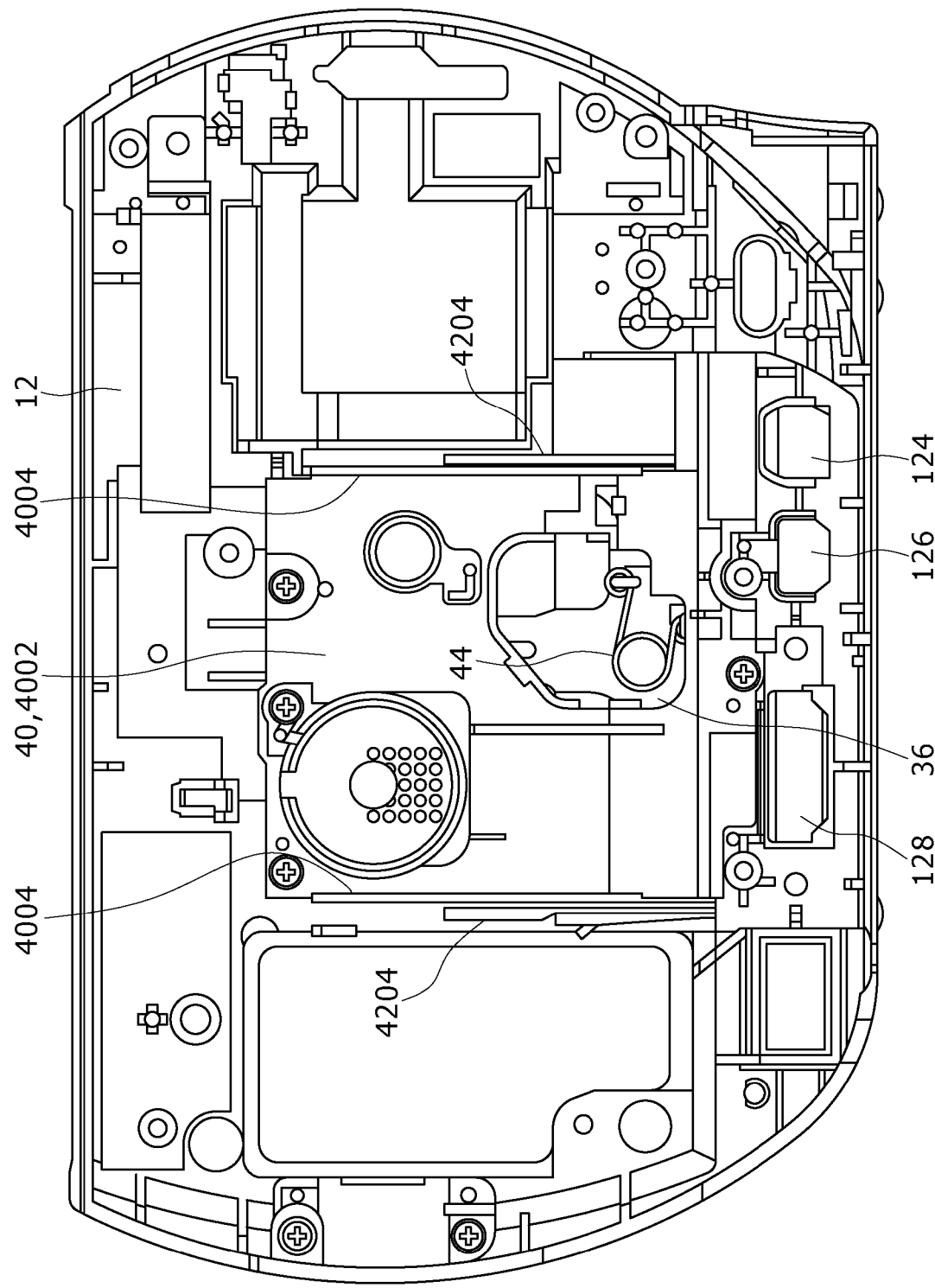
FIG. 14 is a front view in a state where a holder member is provided in the state shown in FIG. 13.

FIGS. 11 to 14, respectively, are explanatory views of a state where a cover 36 is positioned in the closed position. More specifically, FIG. 11 is a perspective view of the storage recess portion 1202. FIG. 12 is a front view of FIG. 11. FIG. 13 is a front view as viewed from the inside of the housing body 12 in a state where an operation member 38 and the cover 36 are built-in. FIG. 14 is a front view in a state where a holder member 40 is provided in the state shown in FIG. 13.

Figure 15:
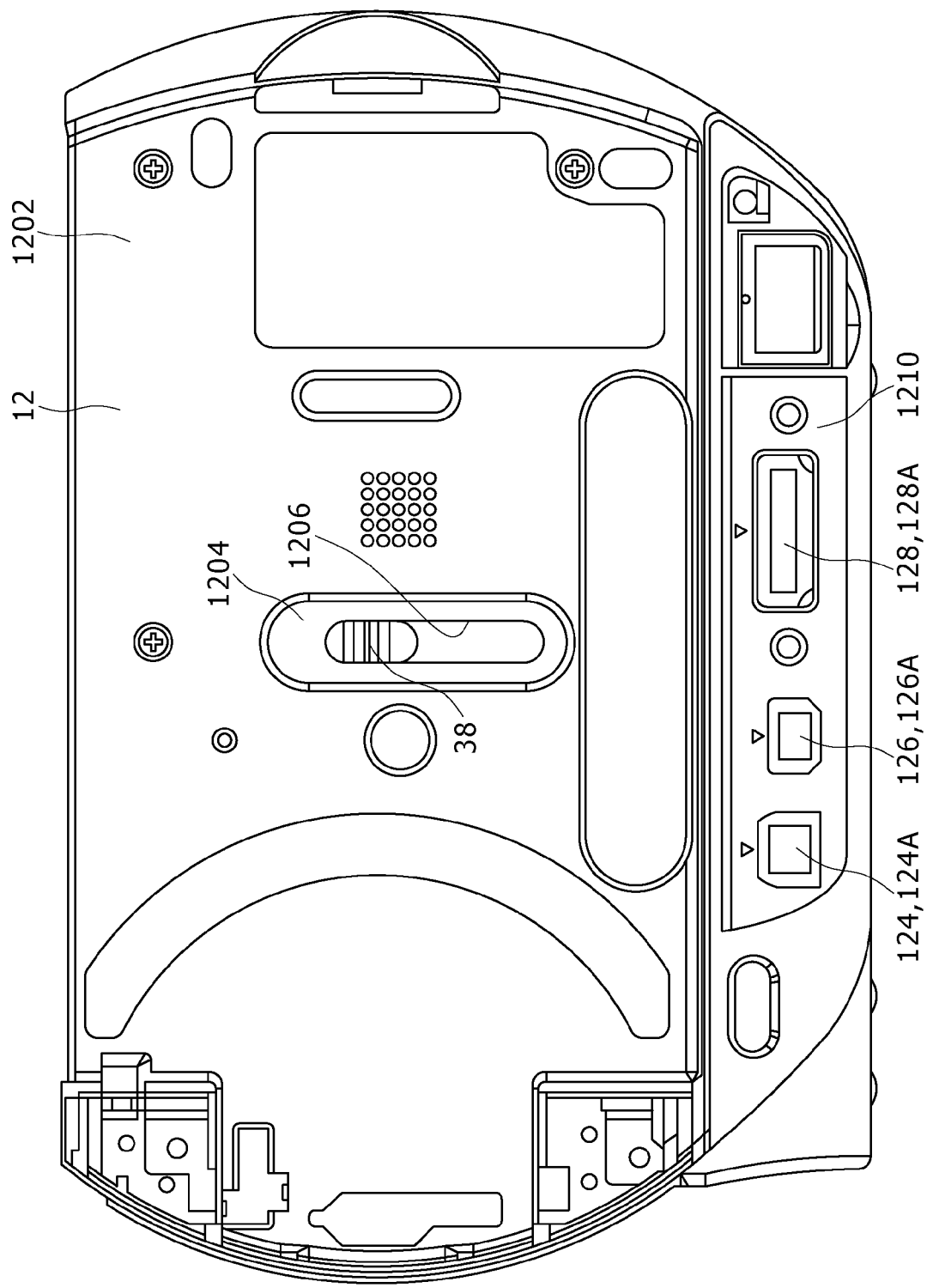
FIG. 15 is a perspective view of the storage recess portion.
Figure 16:
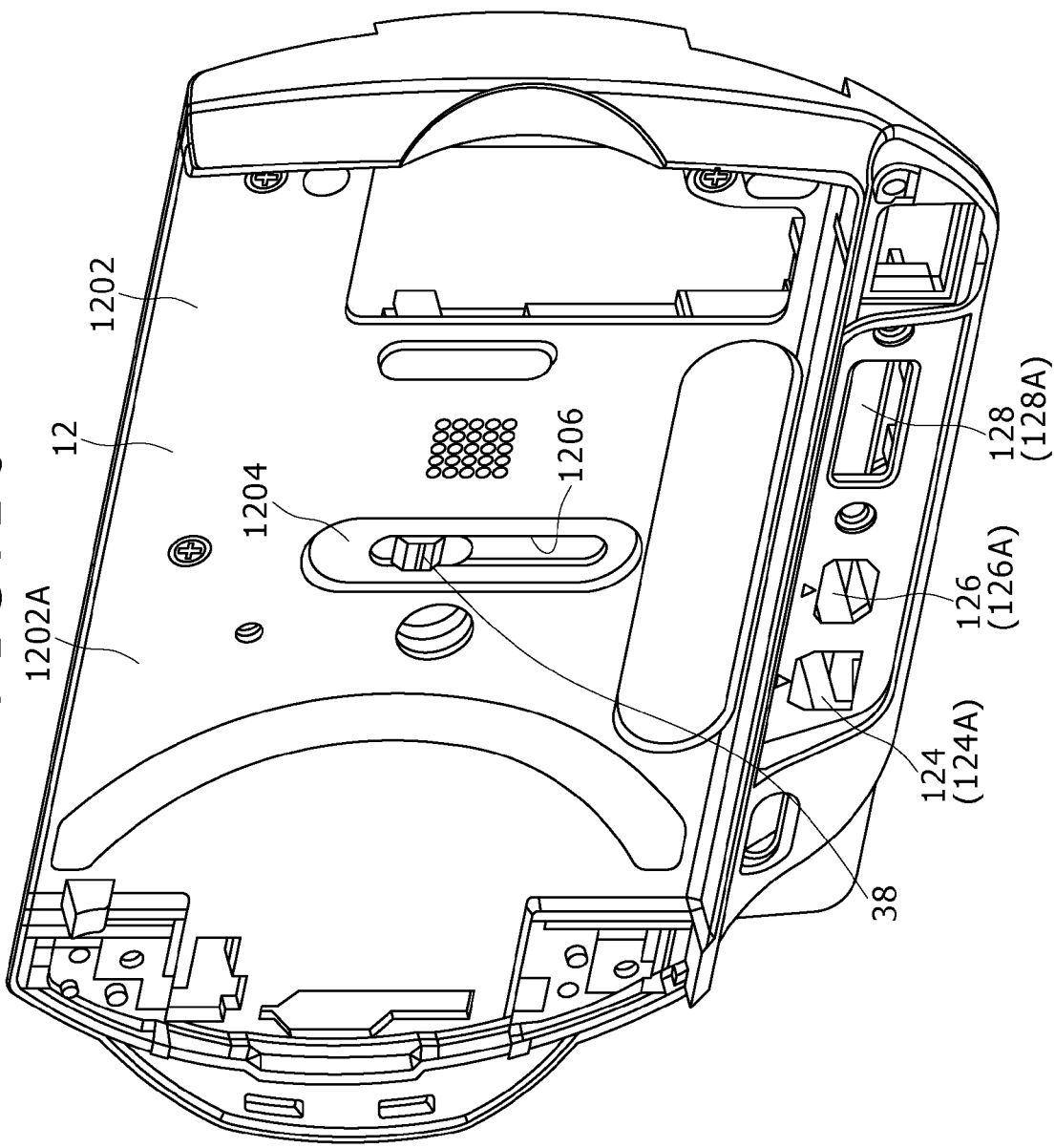
FIG. 16 is a front view of FIG. 15.
Figure 17:
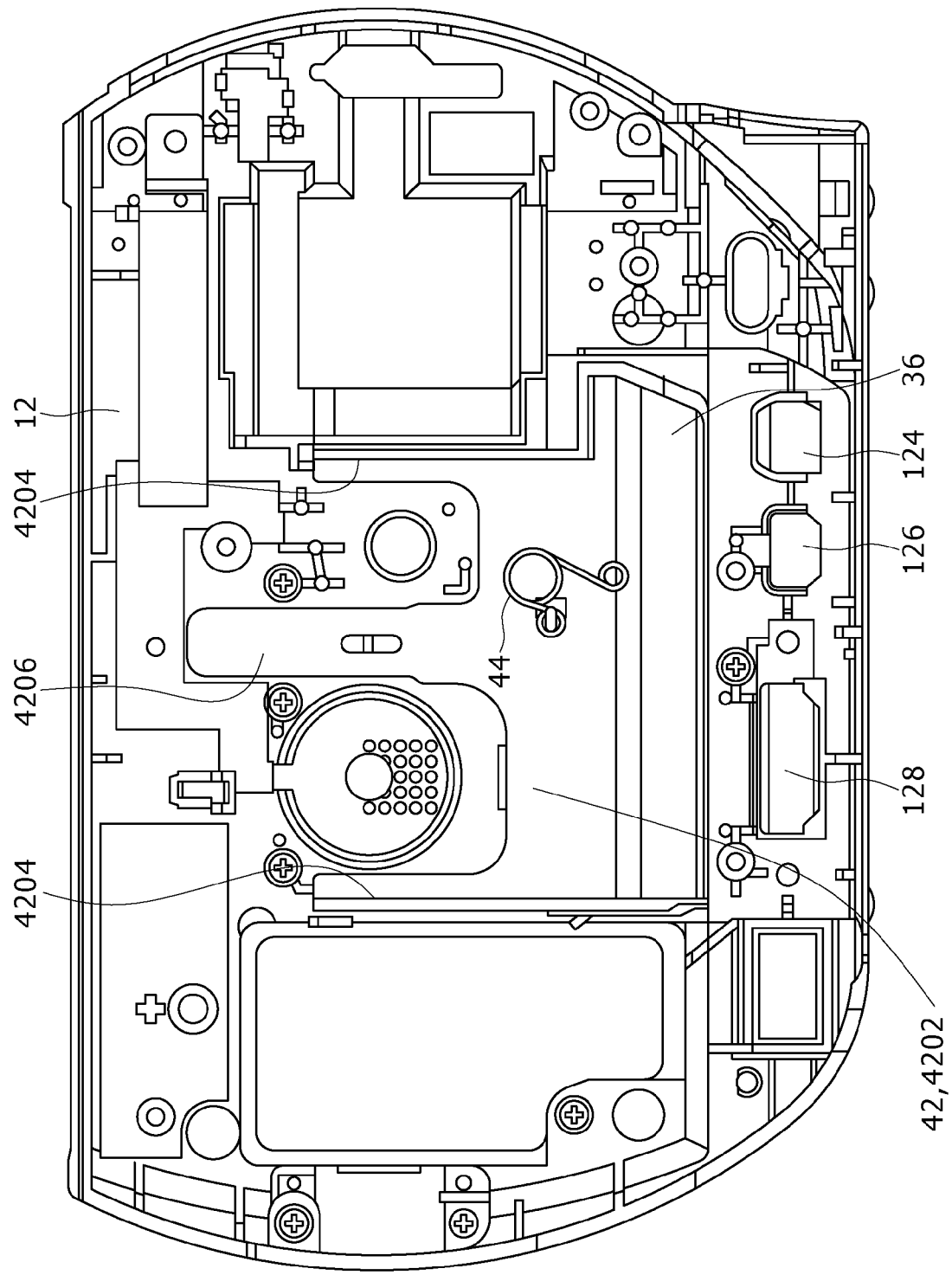
Figure 18:
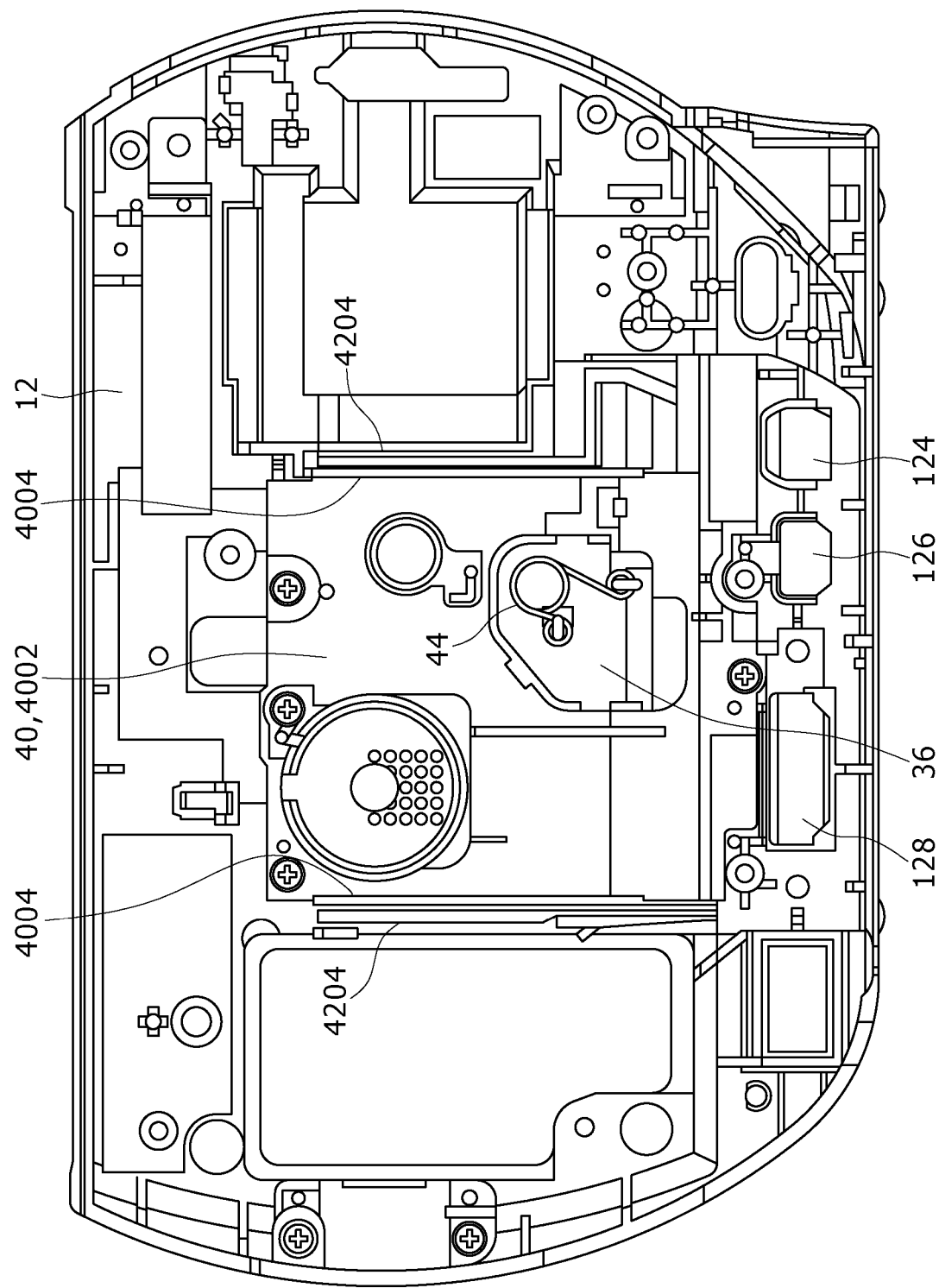
FIG. 18 is a front view in a state where the holder member is provided in the state shown in FIG. 17.
Figure 19:
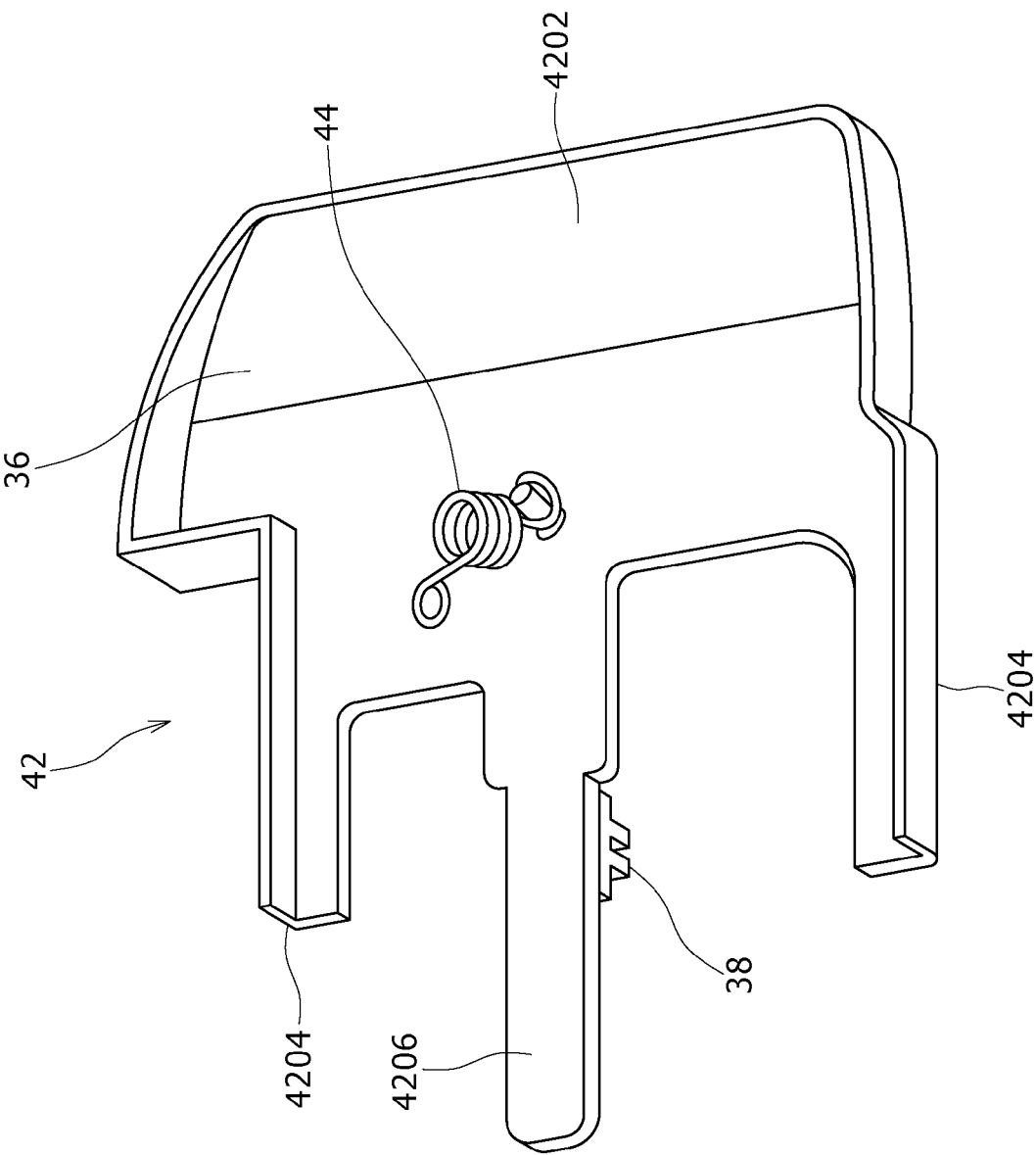
FIG. 19 is a perspective view of the cover.

FIGS. 15 to 18, respectively, are explanatory views of a state where the cover 36 is positioned in the open state. More specifically, FIG. 15 is a perspective view of the storage recess portion 1202. FIG. 16 is a front view of FIG. 15. FIG. 17 is a front view as viewed from the inside of the housing body 12 in a state where the operation member 38 and the cover 36 are built-in. FIG. 18 is a front view in a state where the holder member 40 is provided in the state shown in FIG. 17. FIG. 19 is a perspective view of the cover 36.

With reference to FIGS. 15 and 16, a recess portion 1210 laterally long in the frontward/rearward direction is provided in a left lateral surface portion of the housing body 12, which portion is positioned downward of the storage recess portion 1202. The first to third connectors 124, 126, and 128 are built-in inside of the recess portion 1210.

Openings are formed through the bottom face of the recess portion 1210. Insertion/removal holes 124A, 126A, and 128A for the first to third connectors 124, 126, and 128 are provided, respectively, to be exposed on a lower surface of the left lateral surface of the housing body 12 through the openings. The insertion/removal holes 124A, 126A, and 128A are arranged along the direction perpendicular to the direction of reciprocal movement of the operation member 38 described further below.

More specifically, the insertion/removal holes 124A, 126A, and 128A are provided in the lower portion of the left lateral surface of the housing body 12 that is exposed on the outer side of the display panel 20 in the state where the display panel 20 is positioned in either the storage position (p-a). The insertion/removal holes 124A, 126A, and 128A are provided in the lower portion of the left lateral surface of the housing body 12 that is exposed on the outer side of the display panel 20 even in the state where the display panel 20 is positioned in either the second usage position (p-c).

As shown in FIGS. 11 and 12, the cover 36 for opening or closing the insertion/removal holes 124A, 126A, and 128A are provided to the housing body 12.

The insertion/removal holes 124A, 126A, and 128A are positioned in a portion deflecting rightwardly of the bottom face 1202A of the storage recess portion 1202 (i.e., a portion deflecting along the direction of the right lateral surface of the housing body 12). Further, an opening 1212 (see FIG. 11) for extension or retraction of the cover 36 onto or from the recess portion 1210 is formed on an upper wall of the recess portion 1210.

The operation member 38 for moving the cover 36 along the direction of opening or closing of the insertion/removal holes 124A, 126A, and 128A is provided in the housing body 12. More specifically, the operation member 38 is provided in a portion of the left lateral surface of the housing body 12, which portion is covered by the display panel 20 in the state of the display panel 20 positioned in either the storage position (p-a) or the second usage position (p-c). More specifically, the operation member 38 is provided in a portion of the bottom face 1202A of the storage recess portion 1202.

With reference to FIG. 11, a recess portion 1204 vertically extends on the bottom face 1202A of the storage recess portion 1202, and a groove 1206 vertically extends on a bottom face of the recess portion 1204. The operation member 38 is provided inside of the groove 1206 to be vertically reciprocally movable.

An end of the operation member 38 is provided at the same height as the bottom face 1202A that constitutes the periphery of the recess portion 1204, or is provided to deflect rightwardly of the housing body 12. Thereby, a damage prevention measure is taken to prevent possible damage of, for example, display surface 2002 of the display panel 20 positioned in the storage position (p-a) and the outer face 3402 of the panel housing 34 positioned in the second usage position (p-c).

The operation member 38 and the cover 36 are integrally formed using a hard synthetic resin material. More specifically, the operation member 38 and the cover 36 are formed integrally with a slide member 42 (shown in FIG. 19) made from the hard synthetic resin material.

The slide member 42 includes a laterally long cover plate portion 4202, guide walls 4204, and an operation-member plate portion 4206. The cover plate portion 4202 has a size sufficient to cover the insertion/removal holes 124A, 126A, and 128A. The guide walls 4204, respectively, protrude along a direction perpendicular to the long-side direction from both sides of the cover plate portion 4202 in a long-side direction thereof. The operation-member plate portion 4206 protrudes along the direction perpendicular to the long-side direction from the center of the cover plate portion 4202 in the long-side direction thereof. Thus, the cover 36 is formed of the cover plate portion 4202, and the operation member 38 is provided to the operation-member plate portion 4206.

The slide member 42 is disposed inside of the housing body 12 and on the inner side of the lateral surface of the housing body 12 (inner side of the bottom face 1202A of the storage recess portion 1202). The operation member 38 is disposed to protrude into the recess portion 1204 through the groove 1206, and is provided to be vertically reciprocally movable along and in the groove 1206.

With reference to FIGS. 14 and 18, the holder member 40 includes a plate portion 4002 that abuts a back surface of the slide member 42, thereby to hold the slide member 42 between itself and the housing body 12. Edge portions 4004 on both sides of the plate portion 4002 contact inner surfaces of two guide walls 4204, whereby the slide member 42 is supported to be vertically slidable.

As shown in FIGS. 11 to 14, in the state that the operation member 38 is positioned in a first position corresponding to a lower end of the groove 1206, the cover 36 is positioned in the closed position closing the insertion/removal holes 124A, 126A, and 128A. On the other hand, as shown in FIGS. 15 to 18, in the state that the operation member 38 is positioned in a second position corresponding to an upper end of the groove 1206, the cover 36 is positioned in an opened position. Thereby, the insertion/removal holes 124A, 126A, and 128A are opened and retracted into the housing body 12 (inner side of the bottom face 1202A of the storage recess portion 1202).

In the state that the cover 36 is positioned in the closed position, which closes the insertion/removal holes 124A, 126A, and 128A, the surface of the cover 36 and left lateral surface portions of the housing body 12 positioned in the frontward and rearward and lower portions of the storage recess portion 1202 are positioned on the same plane. Consequently, the cover 36 performs vertical linear reciprocal movement between the closed and opened positions.

Further, during the reciprocal movement of the operation member 38 between the first and second positions, i.e., during the movement of the cover 36 between the close and opened positions, the operation-member plate portion 4206 closes a remaining portion of the groove 1206, excepting a portion where the operation member 38 is positioned. Thereby, dusts are prevented from entering into the housing body 12.

Further, as shown in FIGS. 13, 17, and 19, a toggle spring 44 is provided between the back surface of the cover 36 (slide member 42) and the holder member 40 opposing the cover 36. During the movement from the first position to the second position, when the operation member 38 moves past a midway portion between the first and second positions, the toggle spring 44 urges the operation member 38 to the second position. Alternatively, during movement to the first position to the second position, when the operation member 38 moves past the midway portion between the first and second positions, the toggle spring 44 urges the operation member 38 to the first position.

With the function of the toggle spring 44, the operation member 38 is held to stay at the first and second positions, thereby to improve operability for opening or closing the cover 36. The first and second positions are determined by, for example, abutment of the operation member 38 on the upper and lower ends of the groove 1206.

According to the configuration thus formed, moving the operation member 38 enables the insertion/removal holes 124A, 126A, and 128A of the first to third connectors 124, 126, and 128 to be easily opened or closed. This is advantageous to improve the operability.

Further, when being positioned in the opened position, the cover 36 is stored in the housing body 12, such that the cover 36 is not a hindrance when cable connectors are inserted and removed from the connectors on the image capture apparatus 10. This is advantageous to improve the operability for insertion or removal connection or disconnection between the connectors.

Further, unlike an existing cover that is engaged with the connectors, the cover 36 (itself) of the present embodiment need not have flexibility. As such, the cover 36 can be formed from, for example, the same material as the hard synthetic resin material used for the housing body 12.

Accordingly, when the cover 36 is positioned in the closed position, the cover 36 has the exterior integral with the housing body 12. When the cover 36 is positioned in the opened position, the cover 36 is stored in the housing body 12, but does not hang on the outside. This is advantageous to improve the design function of the image capture apparatus 10.

Further, the operation member 38 is provided in the portion covered by the display panel 20 when positioned in the storage position (p-a). This is advantageous since unintended or incorrect operation of the operation member 38 can be prevented.

The insertion/removal holes 124A, 126A, and 128A can be provided on any portion of the upper, rear, lower, and front surfaces of the display panel 20 inasmuch as the portion is exposed on the outside of display panel 20 in the state that the display panel 20 is positioned in the storage position (p-a). However, suppose that the insertion/removal holes (124A, 126A, and 128A) are provided in any one of lower, upper, and rear portions of a lateral surface of the housing body 12. In this case, as in the present embodiment, the operation member 38 and the cover 36 can be integrated, and the movements of the operation member 38 and the cover 36 can be simplified. This is advantageous to achieve cost reduction and compactness. Further, in the case where, as in the present embodiment, the insertion/removal holes are provided in the lower portion of the left lateral surface of the housing body 12, image capture can be performed without problems by holding the righthand side portion of the image capture apparatus 10 in the state where a connector is connected to any one of the third connectors 124, 126, and 128. This is even more advantageous to secure the operability.

Of course, the configuration described above is adaptable to various image capture apparatuses other than video cameras, such as digital still cameras. Further, the configuration is adaptable not only to such image capture apparatuses, but also to other electronic apparatuses, such as notebook personal computers, mobile phones, monitor-equipped disk playback apparatuses.

First and second printed circuit boards 46 and 48 built-in in the image capture apparatus 10 will be described herebelow.

Figure 20:
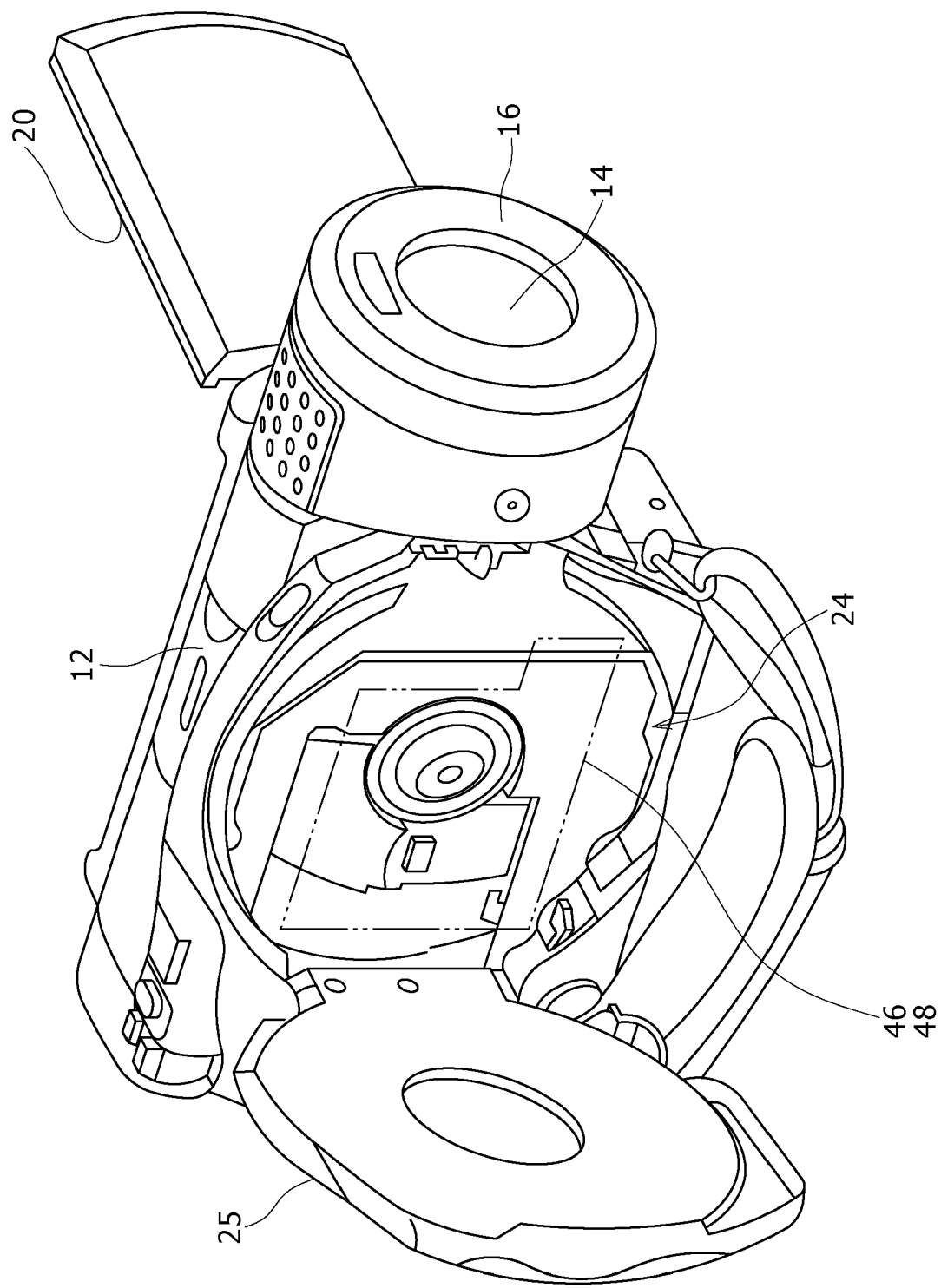
FIG. 20 is a perspective view showing arrangements of first and second printed circuit boards.
Figure 21A:
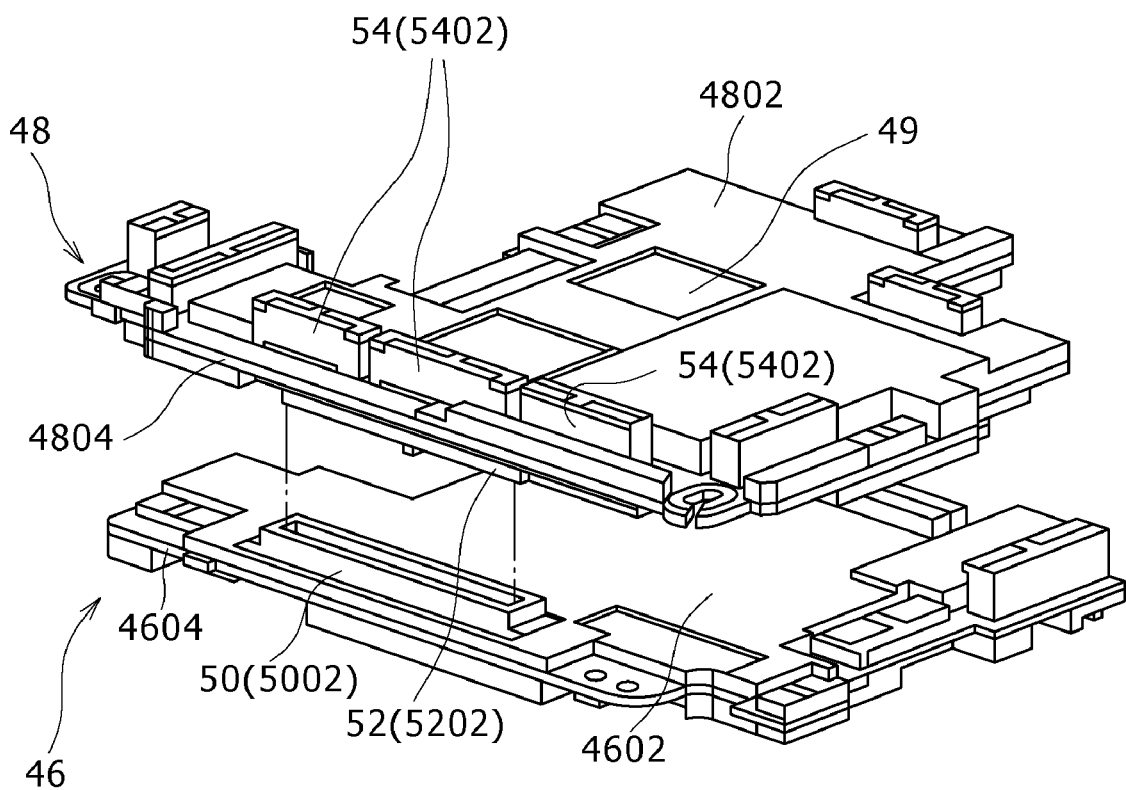
FIGS. 21A and 21B are each an explanatory assembly view of the first and second printed circuit boards.
Figure 21B:
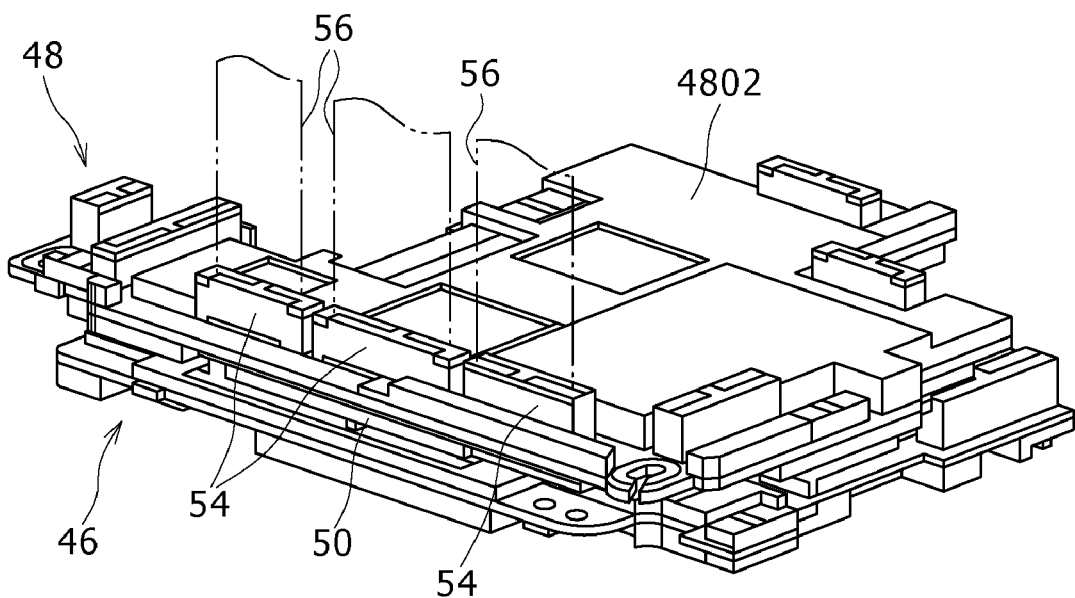
Figure 23:
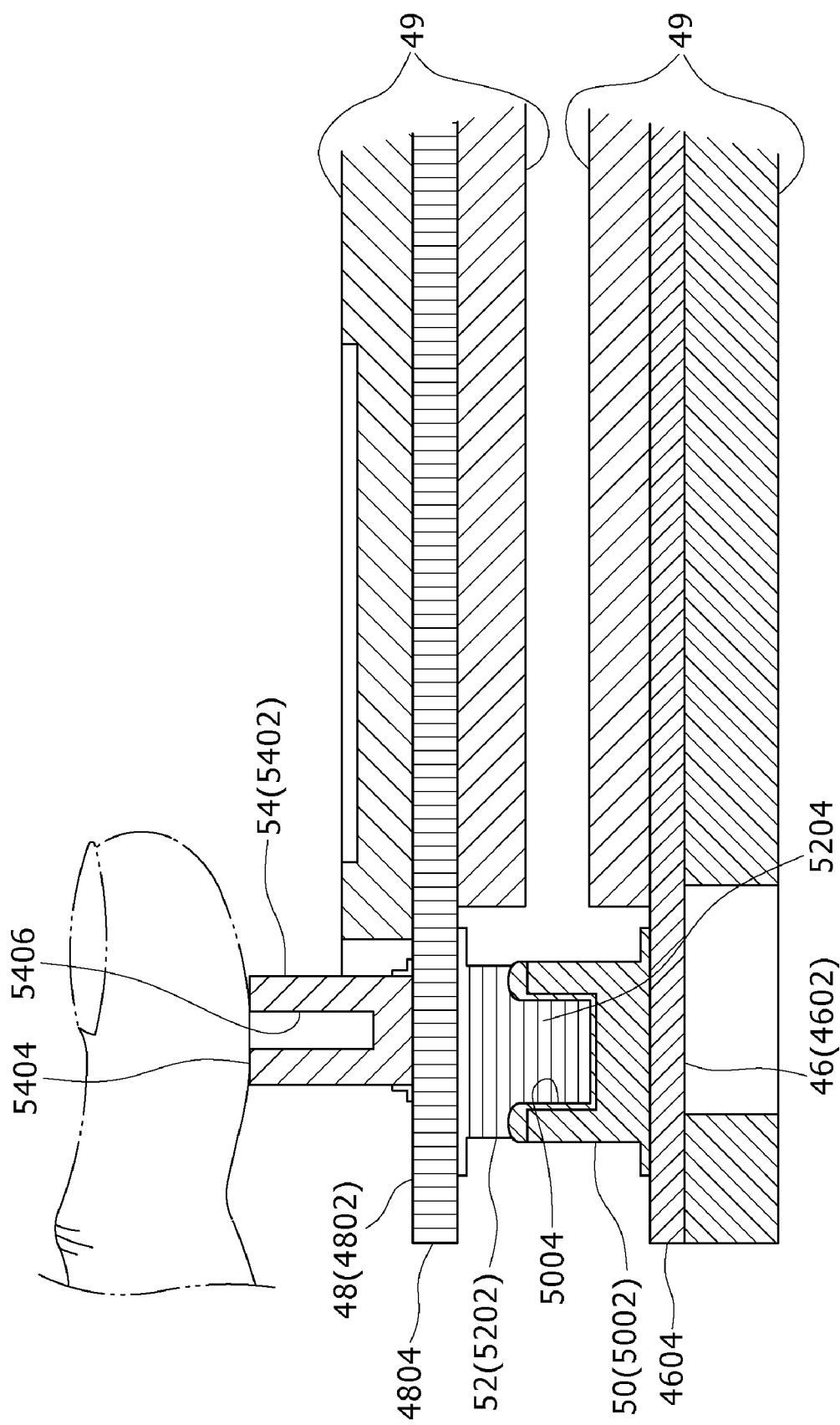
FIG. 23 is a cross sectional view taken along the line A-A of FIG. 22A.
Figure 24:
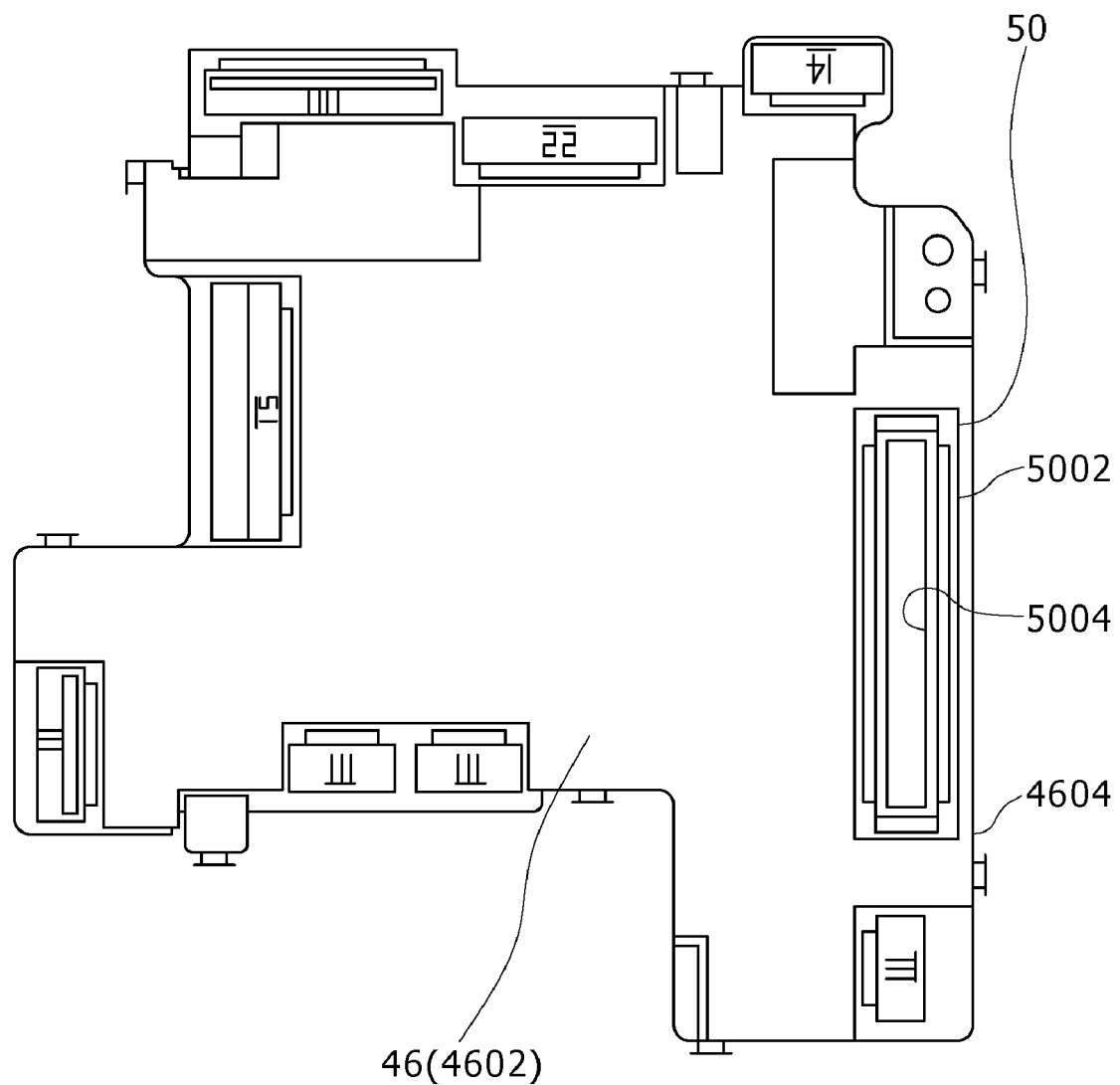
FIG. 24 is a plan view of the first printed circuit board.
Figure 25A:
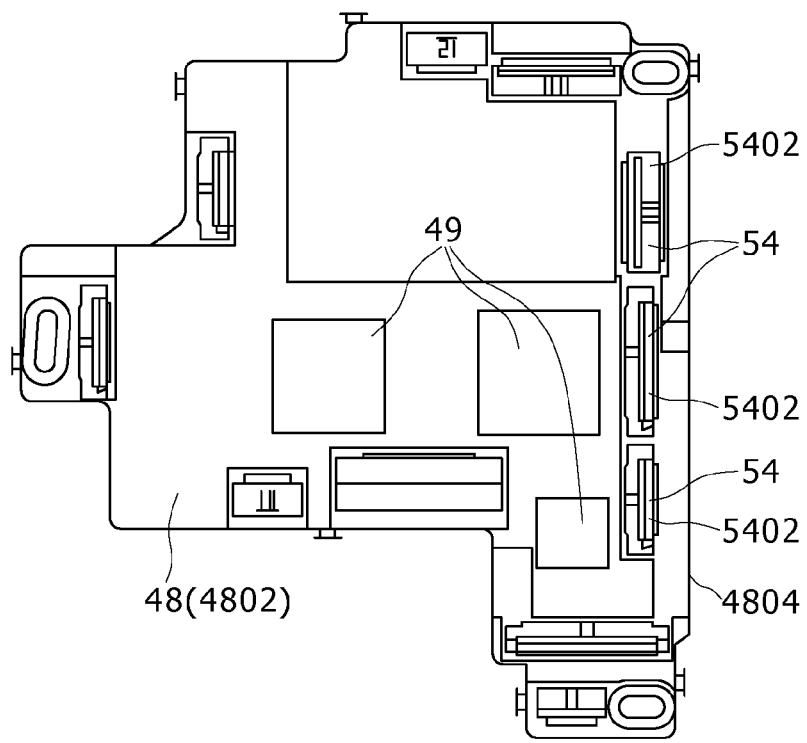
FIG. 25A is a plan view of the second printed circuit board.
Figure 25B:
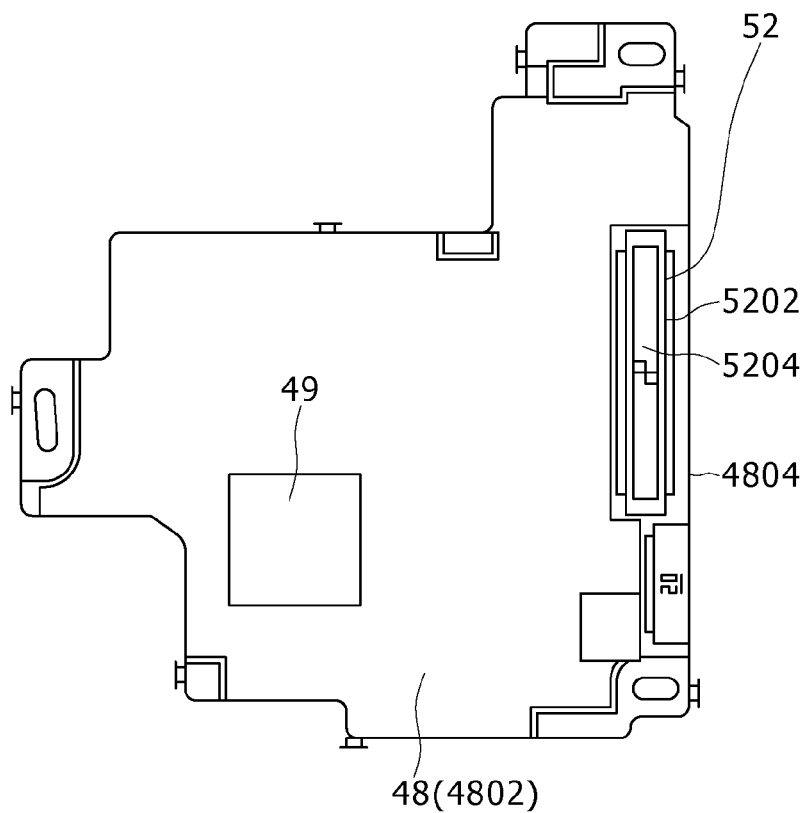
FIG. 25B is a rear view of the second printed circuit board.

FIG. 20 is a perspective view showing the respective arrangements of the first and second printed circuits 46 and 48. FIGS. 21A and 21B are each an explanatory assembly view of the first and second printed circuit boards 46 and 48. FIG. 22A is a plan view of the assembled first and second printed circuit boards 46 and 48; FIG. 22B is a view in the direction shown by the arrow B of FIG. 22A; and FIG. 22C is a view in the direction shown by the arrow C of FIG. 22A. FIG. 23 is a cross sectional view taken along the line A-A of FIG. 22A. FIG. 24 is a plan view of the first printed circuit board 46. FIG. 25A is a plan view of the second printed circuit board 48; and FIG. 25B is a rear view of the second printed circuit board 48.

With reference to FIG. 20, the interior of the housing body 12 includes a chassis (not shown). The first circuit board 46 is attached to the chassis, and the second circuit board 48 is attached to the first circuit board 46.

More specifically, with reference to FIG. 21, the first and second printed circuit boards 46 and 48, respectively, have rigid base board portions 4602 and 4802. The respective base board portion 4602, 4802 has, for example, an insulative substrate and wire lines formed on the insulative substrate. The respective base board portion 4602, 4802 has various electronic components mounted by soldering or the like. The electronic components are electrically connected by the wire lines, whereby various circuits are configured. In FIGS. 21A to 25B, numeral 49 denotes an electronic component, such as an IC, LSI, chip resistor, or chip condenser or capacitor, mounted on the respective base board portion 4602, 4802.

The image data processing portion 102, the recording/playback circuit 108, and the control circuit 110, for example, are each configured by a circuit formed of the respective base board portion 4602, 4802.

With reference to FIG. 21 and FIGS. 22A to 22C, the first and second printed circuit boards 46 and 48, respectively, are connected to one another in the manner that base board-to-base board connectors 50 and 52 are relatively moved along the thickness direction of the respective base board portions 4602 and 4802.

In the connected state, the base board portions 4602 and 4802 of the first and second printed circuit boards 46 and 48 are close and parallel to one another to an extent not permitting interference among the various electronic components mounted on the first and second printed circuit boards 46 and 48.

The base board portions 4602 and 4802 of the first and second printed circuit boards 46 and 48, respectively, have linearly extending edges 4604 and 4804. The edges 4604 and 4804 are disposed to match with one another as viewed from the length direction of the first and second printed circuit boards 46 and 48 in the state that the first and second printed circuit boards 46 and 48 are connected to one another by the base board-to-base board connectors 50 and 52.

With reference to FIGS. 21A, 21B, 23, 24, 25A, and 25B, the base board-to-base board connectors 50 and 52 provided to the first and second printed circuit boards 46 and 48, respectively, have linearly extending slender housings 5002 and 5202.

The respective base board-to-base board connectors 50 and 52, which are provided to the first and second printed circuit boards 46 and 48, are disposed in the manner that the long-side directions of the housings 5002 and 5202 are parallel to the edges 4604 and 4804 in the vicinity of the edges 4604 and 4804.

With reference to FIG. 23, the housing 5002 of the base board-to-base board connector 50, which is provided to the first circuit board 46, includes an upper surface parallel to the base board portion 4602. An insertion/removal opening 5004 having a concave shape (in a cross sectional view) is provided on the upper surface of the housing 5002 to extend along the long-side direction of the housing 5002.

The housing 5202 of the base board-to-base board connector 52, which is provided to the second circuit board 48, includes an insertion portion 5204 having a convex shape (in a cross sectional view) and engageable/disengageable from the insertion/removal opening 5004 along the thickness direction of the base board portion 4802. The insertion portion 5204 extends along the long-side direction of the housing 5202.

The insertion/removal opening 5004 includes a large number of first connection terminals (not shown) at a predetermined pitch along the long-side direction of the housing 5002. The insertion portion 5204 includes second connection terminals (not shown) at a predetermined pitch along the long-side direction of the housing 5202 for connecting to the respective first connection terminals. For example, 100 first connection terminals and 100 second connection terminals are provided at a 0.3 mm pitch.

The first and second printed circuit boards 46 and 48 are relatively moved along the thickness direction of the base board portions 4602 and 4802, whereby the insertion portion 5204 is inserted into and connected to the insertion/removal opening 5004. Concurrently, the base board-to-base board connectors 50 and 52 are connected to one another, and the first and second printed circuit boards 46 and 48 are electrically connected to one another, whereby, for example, signals and power are interactively communicated.

With reference to FIGS. 21A, 21B, 23, 25A, and 25B, an exterior-connection connector 54 for connecting the second circuit board 48 to an exterior portion is provided in a portion corresponding to the base board-to-base board connector 52. The aforementioned portion is a part of the outer face of the base board portion 4802 of the second circuit board 48, which outer face is positioned opposite the plane through which the base board portion 4802 of the second circuit board 48 opposes the first circuit board 46.

The housing 5402 of the exterior-connection connector 54 has a linearly extending slender shape and extends along a direction apart from the outer face in the thickness direction of the base board portion 4802. The housing 5402 is disposed such that the long-side direction thereof is parallel to the long-side direction of the base board-to-base board connector 52.

With reference to FIGS. 21A, 21B, and 23, contours of the housings 5402 of the respective exterior-connection connectors 54 overlap with a contour of the housing 5202 of the base board-to-base board connector 52, as viewed from the thickness direction of the base board portions 4602 and 4802 of the first and second printed circuit boards 46 and 48.

In the present embodiment, a plurality of exterior-connection connectors 54 are provided. Housings 5402 of the respective exterior-connection connectors 54 each have a linearly extending slender shape smaller in length or shorter than the housing 5202 of the base board-to-base board connector 52. The housings 5402 are disposed such that the long-side directions thereof are parallel to the long-side direction of the base board-to-base board connector 52 so as to be positioned on the same straight line.

Further, the respective contours of the housings 5402 of the plurality of exterior-connection connectors 54 overlap with the contour of the housing 5202 of the base board-to-base board connector 52, as viewed from the thickness direction of the base board portions 4602 and 4802 of the first and second printed circuit boards 46 and 48.

With reference to FIG. 21, the exterior-connection connector 54 is a flexible printed circuit board connection connector to which a flexible printed circuit board 56 is connected (a plurality of electrodes formed to an end portion of the flexible printed circuit board 56 are connected).

With reference to FIG. 23, the housing 5402 of the exterior-connection connector 54 includes an end surface 5404 parallel to the base board portion 4802. An insertion/removal opening 5406 through which an end edge of the flexible printed circuit board 56 is inserted/removed is provided on the end surface 5404. The insertion/removal opening 5406 extends along the long-side direction of the housing 5402.

According to the configuration described above, the base board-to-base board connector 52 of the second circuit board 48 is connected in the following manner to the base board-to-base board connector 50 of the first circuit board 46. As shown in FIG. 23, a finger (digit) is placed on the end surface 5404 of the housing 5402 of the exterior-connection connector 54 of the second circuit board 48 in the state that the base board-to-base board connectors 50 and 52 are set opposite one another, and the end surface 5404 is pushed toward the first circuit board 46. Thereby, the base board-to-base board connectors 50 and 52 can be easily and securely connected together without deformation of the second circuit board 48 due to excessive forces and without the risk of separation of chip components from the base board. This is advantageous to improve workability.

In particular, since the image capture apparatus 10 is compliant with the HDTV specification, the number of signals for communication between the first and second printed circuit boards 46 and 48 is large. As such, the number of terminals provided to the base board-to-base board connectors 50 and 52 is extremely large, such that the force required for connection of the base board-to-base board connectors 50 and 52 is larger than that in the case of existing standard-specification compliant types. However, since the housing 5402 of the exterior-connection connector 54 is used to exert an even larger force, the end surface 5404 of the housing 5402 can easily be pushed with a large force. This is even more advantageous to improve workability.

Further, according to the configuration described above, the respective contours of the housings 5402 of the exterior-connection connectors 54 overlap with the contour of the housing 5202 of the base board-to-base board connector 52, as viewed from the thickness direction of the base board portions 4602 and 4802 of the first and second printed circuit boards 46 and 48. As such, when a finger is placed on the end surface 5404 of the housing 5402 of the exterior-connection connector 54 of the second circuit board 48, and the end surface 5404 is thereby pushed toward the first circuit board 46, the force can be securely transferred to the base board-to-base board connector 52. This is even more advantageous to improve workability.

Further, according to the configuration, the flexible printed circuit board 56 is inserted into the insertion/removal opening 5406 of the housing 5402 of the exterior-connection connector 54 of the second circuit board 48. In this event, the force being exerted on the insertion/removal opening 5406 acts along the direction of connecting the base board-to-base board connectors 50 and 52 together. Consequently, while securely maintaining the connected state of the base board-to-base board connectors 50 and 52, the flexible printed circuit board 56 can be connected to and inserted into the insertion/removal opening 5406.

While the configuration of the present embodiment has been described with reference to the example case of connecting together two printed circuit boards, the configuration can be similarly adapted to the case of connecting three or more printed circuit boards. In this case, the configuration can be formed such that exterior-connection connectors are provided to a printed circuit board disposed on the outermost side, and a housing of the exterior-connection connectors are provided to protrude from the base board portion.

The configuration of the printed circuit boards can, of course, be adapted to digital still cameras and various other image capture apparatuses, but can also be adapted to various electronic apparatuses other than image capture apparatuses.

The structure of stopping the rotation of the panel housing 34 about the second axis P2 will be described herebelow.

Figure 27:
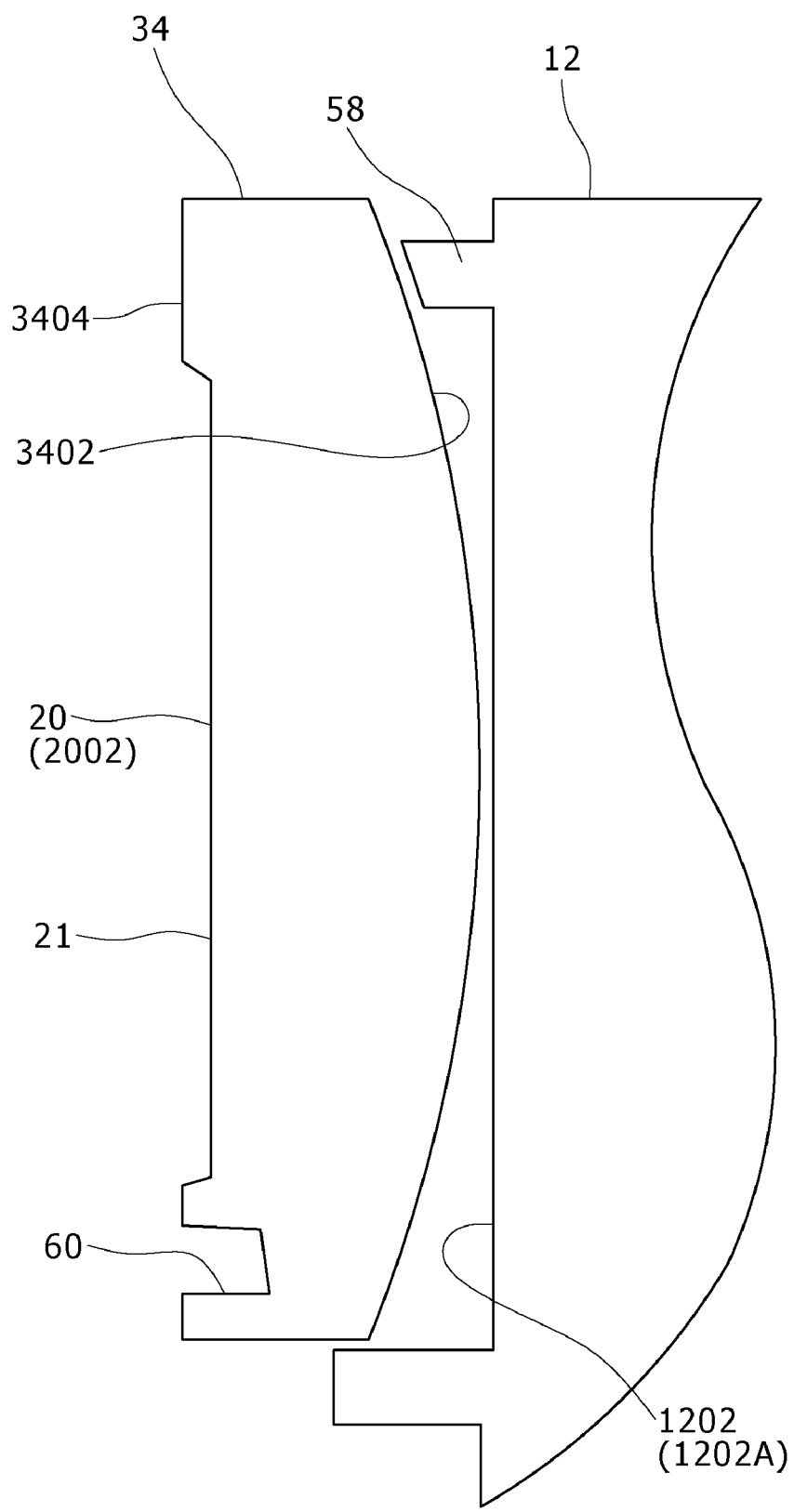
FIG. 27 is a cross sectional view taken along the line A-A of FIG. 26.

FIG. 26 is a perspective view of the image capture apparatus 10 in which the display panel 20 is positioned in the second usage position (p-c). FIG. 27 is a cross sectional view taken along the line A-A of FIG. 26.

With reference to FIGS. 2, 26, and 27, a protrusion 58 is provided to the bottom face 1202A of the storage recess portion 1202, in which the protrusion 58 abuts the outer face 3402 and thereby stops the rotation of the panel housing 34 about the second axis P2. The protrusion 58 thus stops the rotation when, in the state that the panel housing 34 is positioned in the second usage position (p-c), either the inner face 3404 of the panel housing 34 or the display surface 2002 is pushed toward the outer face 3402 of the panel housing 34.

More specifically, the protrusion 58 thus provided abuts the outer face 3402 and thereby stops the rotation of the panel housing 34 about the second axis P2 when either any of the switches 32A, 32B, and 32C provided on the inner face 3404 or the touchpanel 21 is pushed.

The protrusion 58 is positioned to be capable of abutting a portion of the outer face 3402 of the panel housing 34. The portion is positioned either in a front side portion or in the vicinity of the front side portion in the state that the panel housing 34 is positioned in the second usage position (p-c). More specifically, the protrusion 58 is provided in a front-end upper portion of the bottom face 1202A.

According to the present embodiment, even when a lower portion of the inner face 3404 is pushed in the state that the panel housing 34 is positioned in the second usage position (p-c), the panel housing 34 is rotatable only within the angular range of 270 degrees about the second axis P2, the panel housing 34 does not rotate in the full angular range of one rotation about the second axis P2. As such, for enabling the panel housing 34 to be rotatable in an angular range exceeding 270 degrees about the second axis P2, a protrusion similar to the protrusion 58 is provided in a lower portion of the bottom face 1202A.

The inner face 3404 of the panel housing 34 has a recess portion 60 for receiving the protrusion 58 in the state that the panel housing 34 is positioned in the storage position (p-a). More specifically, as shown in FIG. 2, the recess portion 60 is provided in a front-end upper portion of the inner face 3404.

According to the configuration thus formed, the protrusion 58 abuts the outer face 3402 of the panel housing 34, and the rotation of the panel housing 34 about the second axis P2 is stopped thereby, whereby the panel housing 34 is tightly held to the second usage position (p-c) without being loosened. As such, although the outer face 3402 of the panel housing 34 has the arcuate face, the pushing operation of either the touchpanel 21 or any of the switches 32A, 32B, and 32C can be carried out not only comfortably but also securely. This is advantageous to improve the operability of the switches or the like provided on the side of the inner face 3404 of the panel housing 34 while enhancing design function.

Further, the rotation of the panel housing 34 can be stopped by the very simple configuration formed by providing the protrusion 58 to the bottom face 1202A of the storage recess portion 1202. This is advantageous to obtain the image capture apparatus 10 having good design function while minimizing cost increases.

Further, in the present embodiment, the protrusion 58 is provided in the vicinity of the second axis P2. This is advantageous to securely stop the rotation of the panel housing 34 about the second axis P2 when either any of switches 32A, 32B, and 32C (provided in the inner face 3404) or the touchpanel 21 is pushed.

The shape of the protrusion 58, the number of protrusions 58, the disposition portion of the protrusion 58, and the like can be optionally determined or modified in the design of the apparatus.

Further, the storage recess portion 1202 can be omitted. In this case, the lateral surface of the housing body 12 or the like can be an storage face of the housing body 12 to which the display surface 2002 is positioned in close proximity in the state that the panel housing 34 is positioned in the storage position (p-a). However, the provision of the storage recess portion 1202 as in the present embodiment offers an advantage for enhancing the design function of the image capture apparatus 10 in the state that the panel housing 34 is positioned in the storage position (p-a).

Further, the protrusion 58 can be provided to the outer face 3402 of the panel housing 34 without being provided to the storage face. However, in the configuration including the protrusion 58 provided to the storage face as in the present embodiment, the protrusion 58 is hidden by the panel housing 34 in the state that the panel housing 34 is positioned in the storage position (p-a). This is advantageous to enhance the design function of the image capture apparatus 10.

While the configuration of the present embodiment has been described with reference to the case of the video camera by way of an example of the image capture apparatus, the configuration of the embodiment is of course adaptable to various image capture apparatuses other than video cameras, such as digital still cameras. Further, the configuration is adaptable not only to such image capture apparatuses, but to other electronic apparatuses, such as monitor-equipped printers.

A detecting mechanism 66 for the opening/closing lid 25 will be described herebelow.

Figure 28:
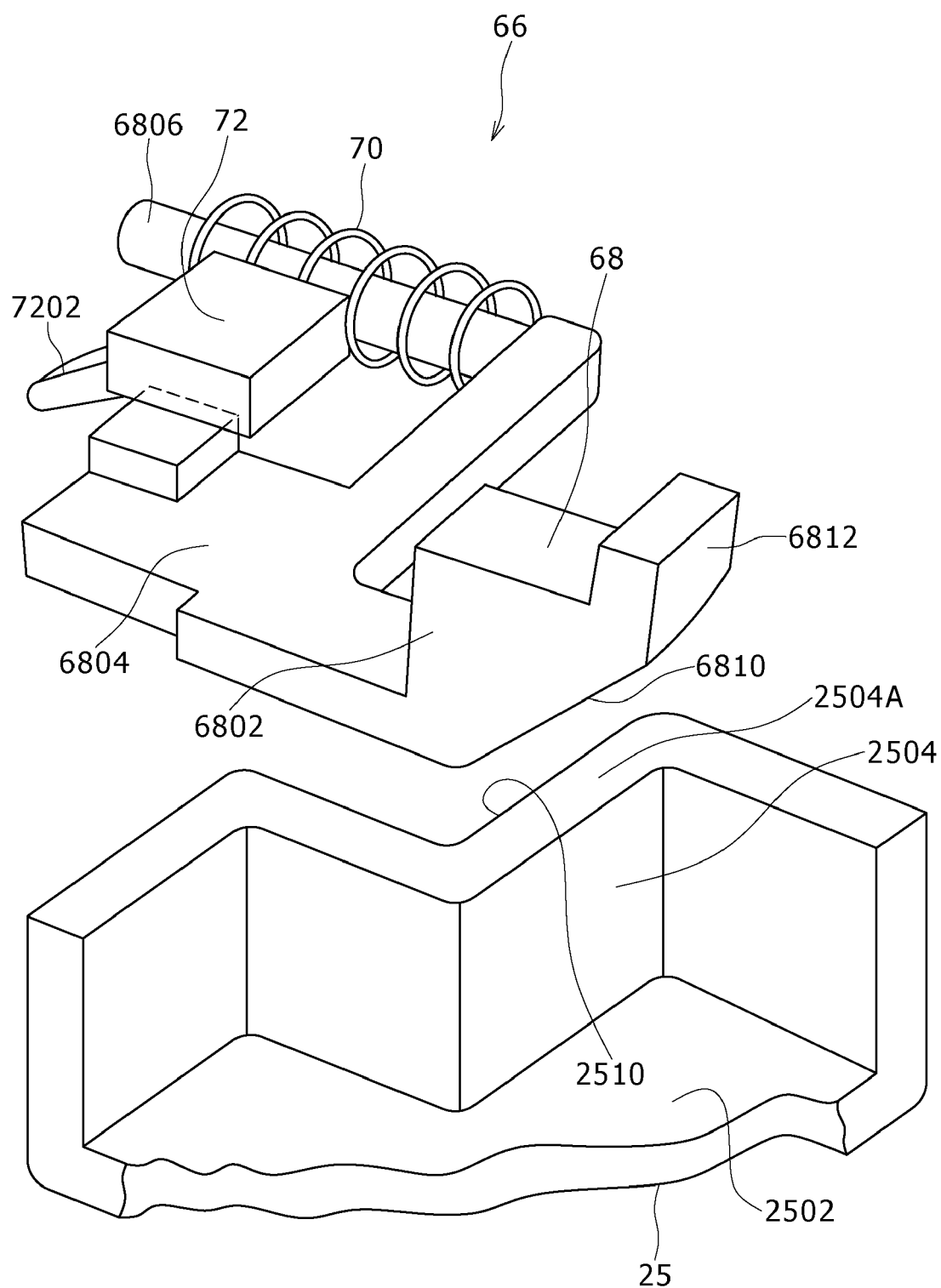
FIG. 28 is a perspective view showing the configuration of a detecting mechanism for an opening/closing lid.
Figure 29:
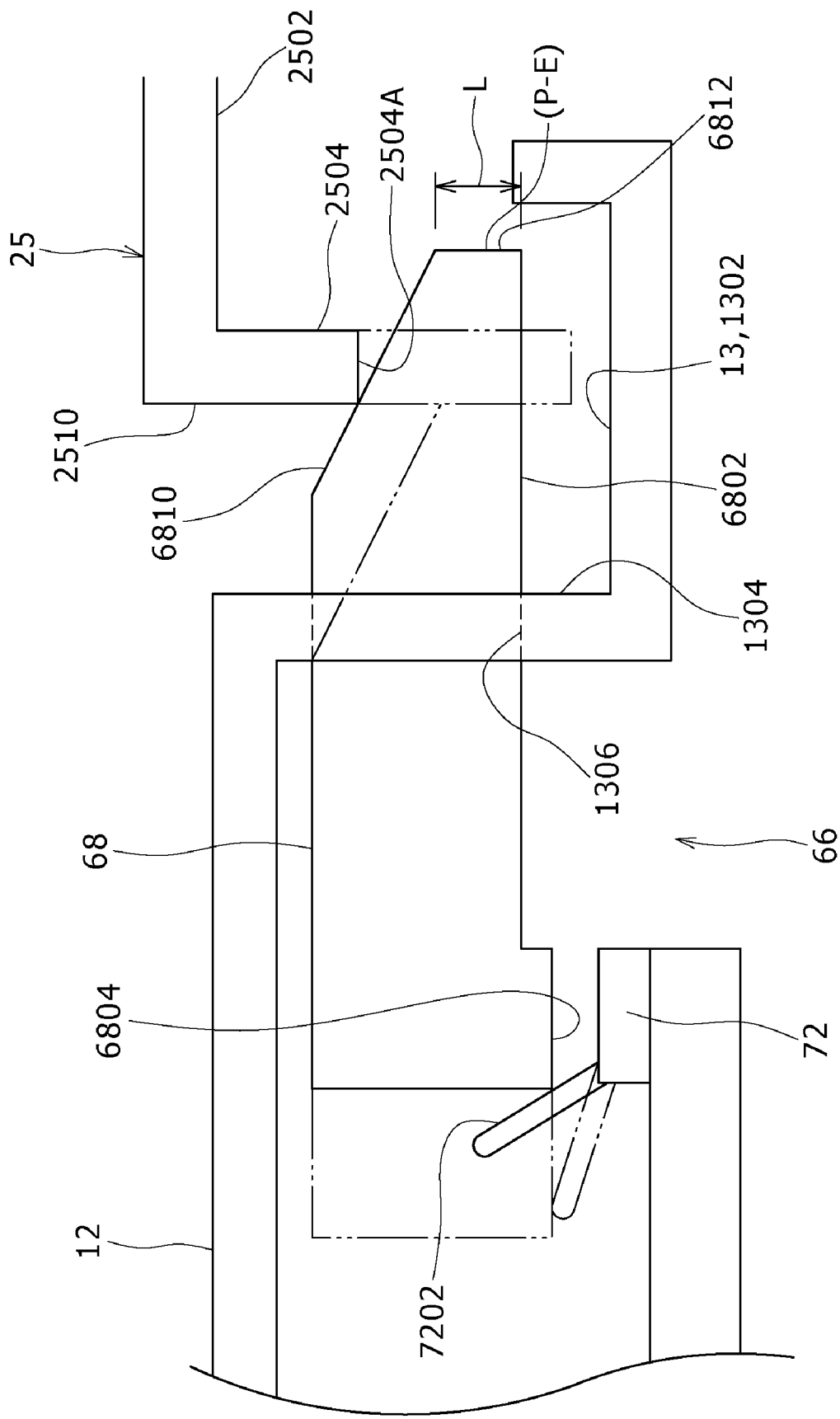
FIG. 29 is an explanatory view of operation of the detecting mechanism.

FIG. 28 is a perspective view showing the configuration of the detecting mechanisms 66 for the opening/closing lid 25. FIG. 29 is an explanatory view of operation of the detecting mechanism 66. FIG. 30 is a block diagram of a control system relevant to the detecting mechanism 66 for and a lock mechanism 62 of the opening/closing lid 25.

First, the lock mechanism 62 will be described herebelow.

The lock mechanism 62 forms a lock state locking the opening/closing lid 25 to a closed position closing the disk mounting portion 24, and cancels or releases the lock state.

As shown in FIG. 3, the lock mechanism 62 is provided inside of a right lateral surface portion of the housing body 12 which portion is positioned frontward of the disk mounting portion 24.

With reference to FIG. 30, the lock mechanism 62 includes a solenoid 6202 attached to the inside of the housing body 12; a lock plate 6204 connected to a movable core 6202A of the solenoid 6202; and a spring (not shown) for urging the movable core 6202A along a protruding direction thereof. The lock plate 6204 engages/disengages from an engagement crawl 6206 of the opening/closing lid 25.

More specifically, the lock plate 6204 is normally positioned in a protruded state. When the opening/closing lid 25 moves from the opened position to the closed position, the lock plate 6204 abuts a sloped surface 6206A of the engagement crawl 6206 and thereby once retracts in opposition to urging forces of the spring (not shown). Then, when the opening/closing lid 25 is positioned in the closed position, the lock plate 6204 extends and engages the engagement crawl 6206 upon receipt of the urging forces of the spring (not shown). Thereby, the lock state is formed that locks the opening/closing lid 25 to the closed position closing the disk mounting portion 24 is closed.

Upon an operation of a lid opening switch 64, the control circuit 110 supplies current to the solenoid 6202, thereby driving the movable core 6202A to retract. Thereby, the engagement between the lock plate 6204 and engagement crawl 6206 is released, and the opening/closing lid 25 enters the state of being movable toward the opened position.

The lock mechanism 62 is thus controlled by the control circuit 110, thereby to prevent undesired incidents. For example, in a state where a light beam is irradiated by the optical pickup 2404 on the disk-like recording medium 2 and a recording operation is being performed on the disk-like recording medium 2, the opening/closing lid 25 is accidentally opened, whereby the recording operation is terminated underway and data is damaged thereby. According to the present embodiment, an incident such as described above can be prevented.

Further, other inconveniences can take place. For example, during the light beam irradiation from the optical pickup 2404, when the opening/closing lid 25 is erroneously released from the closed position for some reason in a non-functioning state, failure can occur with the disk-like recording medium 2, the optical pickup 2404, or the like. For circumventing such inconveniences, the detecting mechanism 66 is provided that detects the movement of the opening/closing lid 25 along the direction of opening from the closed position. The present invention is applied to the detecting mechanism 66.

When the movement of the opening/closing lid 25 along the direction of opening from the closed position is detected by the detecting mechanism 66 during the light beam irradiation by the optical pickup 2404, the control circuit 110 controls the recording/playback mechanism 112 (see FIG. 4) to stop both the light beam irradiation from the optical pickup 2404 and the rotation of the disk-like recording medium 2 by the spindle motor. Thereby, the disk-like recording medium 2, the optical pickup 2404, and the like are protected.

The detecting mechanism 66 is disposed inside of and on the outer side of the recess portion 13 constituting the disk mounting portion 24. As shown in FIG. 3, the detecting mechanism 66 is disposed in a rear and lower portion of the right lateral surface of the housing body 12 in the vicinity of an axis center O3 of the opening/closing lid 25.

With reference to FIGS. 28 and 29, the detecting mechanism 66 includes a slide member 68, a spring 70, and a sensor 72.

As shown in FIGS. 28 and 29, the slide member 68 includes a narrow front portion 6802 and a wide rear portion 6804. The rear portion 6804 is supported by a guide (not shown) provided to the housing body 12. Thereby, the slide member 68 is movable toward or away from the circumferential plate portion 2504 in a plane perpendicular to the circumferential plate portion 2504 (in an intersection plane) in the state that the opening/closing lid 25 is positioned in the closed position.

Further, as shown in FIGS. 3 and 29, an opening 1306 in the lateral surface 1304 of the recess portion 13. The front portion 6802 of the slide member 68 is disposed to extend into the recess portion 13 through the opening 1306 and to be able to abut the circumferential plate portion 2504 of the opening/closing lid 25 positioned in the closed position. The circumferential plate portion 2504 includes a to-be-abutted surface or abutment surface 2510 for enabling secure abutment of the front portion 6802.

With reference to FIG. 28, the spring 70 is disposed by being wound on an axis 6806 of the rear portion 6804. One end of the spring 70 in the long-side direction is anchored to the side of the housing body 12, and the other end thereof is anchored to the side of the rear portion 6804. Thereby, the spring 70 urges the slide member 68 along the direction of extension of the front portion 6802 from the opening 1306.

When a front edge of the rear portion 6804 abuts a portion of the lateral surface 1304 around the opening 1306 in the state that the circumferential plate portion 2504 is deflected outwardly of the recess portion 13, the slide member 68 is positioned in a maximum extension position (p-d) shown by a solid line in FIG. 29, in which the slide member 68 maximally extends to the recess portion 13 through the opening 1306.

Further, a sloped surface 6810 is formed in a portion of the front portion 6802 of the slide member 68 on the side spaced away from the bottom surface 1302 of the recess portion 13. In the maximum extension position (p-d), the sloped surface 6810 causes the slide member 68 to contact an end edge 2504A and to retract into the housing body 12 from the opening 1306 when the circumferential plate portion 2504 enters into the recess portion 13 in association with the movement of the opening/closing lid 25 to the closed position.

An end portion 6812 where the front portion 6802 of the slide member 68 abuts the circumferential plate portion 2504 (abutment surface 2510) has a length L along the direction that the circumferential plate portion 2504 moves when the opening/closing lid 25 moves along the direction of opening from the closed position.

The sensor 72 is provided to the housing body 12 to oppose the rear portion 6804 of the slide member 68. In conjunction with the movement of the slide member 68, the sensor 72 detects the deflection of the slide member 68 from the tilt of a contact piece 7202 that contacts the rear portion 6804, and supplies a detection signal indicative of the contact of the control circuit 110.

Suppose now that, while the lock state of the opening/closing lid 25 is formed by the lock mechanism 62, the opening/closing lid 25 somewhat has moved along the opening direction because of, for example, an elastic deformation caused by exertion of forces on the opening/closing lid 25 in the opening direction due to a user's unintended or incorrect operation. Even in such a case, however, according to the configuration described above, the slide member 68 does not moved and hence the detecting operation is not performed by the sensor 72 during the abutment of the front portion 6802 of the slide member 68 on the circumferential plate portion 2504.

Further, the slide member 68 is disposed movably toward or away from the circumferential plate portion 2504 in the plane perpendicular to the circumferential plate portion 2504 (in the intersection plane) in the state that the opening/closing lid 25 is positioned in the closed position. Thereby, in the event of opening of the opening/closing lid 25, the state of abutment of the front portion 6802 on the circumferential plate portion 2504 can be maintained for an even longer period of time.

Consequently, even when the opening/closing lid 25 is somewhat deformed by an unintended or incorrect operation, the control circuit 110 does not operate for, for example, light beam irradiation and stopping of the rotation of the disk-like recording medium 2. This prevents such an incident in which the recording operation on the disk-like recording medium 2 is stopped underway and data is damaged thereby. This is advantageous to perform a stable recording operation on the housing body 12.

Further, the slide member 68 abuts the portion of the circumferential plate portion 2504 of the opening/closing lid 25. The circumferential plate portion 2504 is originally provided to the opening/closing lid 25, so it has a sufficient strength. This is advantageous to minimize increase in the number of components/parts and to obtain the detecting mechanism at reduced costs.

Further, in the present embodiment, the slide member 68 is disposed in the portion in the vicinity of the axis center O3 of the opening/closing lid 25. The amount of pivotal movement at the opening or closing time is relatively small, such that the state of abutment of the front portion 6802 on the circumferential plate portion 2504 can be maintained for an even longer period of time. This is even more advantageous to perform a stable recording operation on the disk-like recording medium 2.

Further, in the present embodiment, the end portion 6812 where the front portion 6802 of the slide member 68 abuts the circumferential plate portion 2504 (abutment surface 2510)

has the length L along the direction of movement of the circumferential plate portion 2504. Consequently, when the circumferential plate portion 2504 moves from the closed position of the opening/closing lid 25 to the opened position thereof, the state of abutment of the front portion 6802 of the slide member 68 on the circumferential plate portion 2504 can be maintained for an even longer period of time. This is even more advantageous to perform a stable recording operation on the disk-like recording medium 2.

A comparative example will be described herebelow.

FIG. 31 is an explanatory view of operation of a detecting mechanism of a comparative example. The example will be described with reference to the drawing in which like reference symbols denote similar members and portions to those of the above-described embodiment.

In the comparative example, in lieu of the slide member 68 of the embodiment, a spring X is provided inside of the housing body 12. The spring X is deflected by being compressed by the end edge 2504A of the circumferential plate portion 2504 of the opening/closing lid 25. The amount of deflection is detected by the sensor 72.

In the comparative example, the deflection direction of the spring X is identical to the deflection direction of the circumferential plate portion 2504. Accordingly, when having deflected along the direction that the opening/closing lid 25 is opened, the spring X follows the opening/closing lid 25 at all times, such that the attitude of the spring X for detecting the state of the opening/closing lid 25 positioned in the closed position sensitively deflects. As such, the sensor 72 operates for detection of even a slight movement of the opening/closing lid 25 to the opening direction. This is disadvantageous to perform a stable recording operation on the disk-like recording medium 2.

However, according to the present embodiment, the sensor 72 does not operate for detection even when the opening/closing lid 25 slightly moves. This is advantageous to perform a stable recording operation on the disk-like recording medium 2.

While the detecting mechanism 66 for the opening/closing lid has thus been described with reference to the case in which the image capture apparatus is the video camera, the detecting mechanism 66 is, of course, adaptable to various other image capture apparatuses, such as digital still cameras, using a disk-like recording medium. However, the detecting mechanism 66 is also adaptable to various types of known, existing disk devices, such as CD (compact disk) players, MD (mini disk) players, and DVD (digital versatile disk) players.

It should be understood by those skilled in the art that various modifications, combinations, sub-combinations, and alterations may occur depending upon design requirements and other factors insofar as they are within the scope of the appended claims or the equivalents thereof.

What is claimed is:

1. An image capture apparatus, comprising:
a housing body constituting an exterior;
an image capture optical system for guiding an image of a subject into an interior of the housing body;
an image capture device for capturing the image guided by the image capture optical system;
a display panel for displaying the image captured by the image capture device, the display panel being secured to the housing body to be pivotable between a usage position where a display surface of the display panel is visible and a storage position where the display surface of the display panel is in contact with a surface of the housing body;
a connector for connection to an external device, the connector being built-in in the housing body and having an insertion/removal opening exposed on a surface of the housing body, wherein the insertion/removal opening is provided in a portion of the housing body, which portion is exposed on an outer side of the display panel in a state that the display panel is positioned in the storage position;
a cover for opening or closing the insertion/removal opening by extending or retracting on the insertion/removal opening from the interior of the housing body; and
an operation member that moves the cover along a direction of opening or closing the insertion/removal opening, the operation member being provided on a portion of the housing body that faces the display surface in the state that the display panel is positioned in the storage position,
wherein,
the operation member is reciprocally movable via a spring between a first position and a second position along the surface of the housing body, the reciprocal movement corresponding to a movement of the cover.

2. The image capture apparatus according to claim 1, wherein:
the cover is positioned in a closed position closing the insertion/removal opening in a state that the operation member is positioned in the first position, and the cover is positioned in an opened position opening the insertion/removal opening and retracting into the interior of the housing body in a state that the operation member is positioned in the second position; and
the spring is a toggle spring that (a) urges the operation member to the second position when the operation member moves from the first position to the second position such that the operation moves past a middle portion between the first position and the second position or that (b) urges the operation member to the first position when the operation member moves from the first position to the second position such that the operation member moves past the middle portion between the first position and the second position.

3. The image capture apparatus according to claim 1, wherein:
portions where the provision of the insertion/removal opening and the operation member are provided are portions of a lateral surface of the housing body;
the cover is positioned in a closed position closing the insertion/removal opening in a state that the operation member is positioned in a first position, and the cover is positioned in an opened position opening the insertion/removal opening and retracting into the interior of the housing body in a state that the operation member is positioned in a second position;
the operation member performs vertical linear reciprocal movement between a first position and a second position; and
the cover performs vertical linear reciprocal movement between the closed position and the opened position.

4. The image capture apparatus according to claim 1, wherein:
the operation member protrudes from an operation member plate portion;
the portion where the operation member is provided is a lateral surface of the housing body;
a groove extends on the lateral surface of the housing body;

the operation member plate portion is disposed on an inner side of the lateral surface of the housing body in the interior of the housing body, and the operation member is disposed inside of the groove to be exposed on the lateral surface of the housing body, wherein the operation member is reciprocally movable between a first position and a second position along an extension direction of the groove;

the cover is positioned in a closed position closing the insertion/removal opening in a state that the operation member is positioned in the first position, and the cover is positioned in an opened position opening the insertion/removal opening and retracting into the interior of the housing body in a state that the operation member is positioned in the second position; and during the reciprocal movement of the operation member between the first position and the second position, the operation member plate portion closes a remaining portion of the groove excepting a portion where the operation member is positioned.

5. The image capture apparatus according to claim 1, wherein:

the portion where the operation member is provided is a portion of a lateral surface of the housing body;

a groove vertically extends on the lateral surface of the housing body; and the operation member is provided inside of the groove to be vertically reciprocally movable along the groove.

6. The image capture apparatus according to claim 1, wherein:

the portion where the operation member is provided is a portion of a lateral surface of the housing body;

the lateral surface of the housing body includes a recess portion;

a groove extends on a bottom face of the recess portion;

the operation member is disposed on an inside of the lateral surface and is provided inside of the groove to be reciprocally movable along the groove so that an end portion of the operation member protrudes externally of the lateral surface through the groove;

an end of the operation member is provided either to be positioned at the same height as the lateral surface constituting a periphery of the recess portion or to deflect inwardly of the lateral surface toward the bottom face of the recess portion.

7. The image capture apparatus according to claim 1, wherein:

the insertion/removal opening is provided in a lower portion of a lateral surface of the housing body, the lower portion being positioned downwardly of the display panel in the state that the display panel is positioned in the storage position;

the lateral surface of the housing body includes a recess portion;

a groove vertically extends on a bottom face of the recess portion;

the operation member is disposed on an inside of the lateral surface and is provided inside of the groove to be vertically reciprocally movable along the groove so that an end portion of the operation member protrudes externally of the lateral surface through the groove; and the cover is positioned in a closed position closing the insertion/removal opening in a state that the operation member is positioned in a first position corresponding to a lower end of the groove and the cover is positioned in an opened position opening the insertion/removal opening and retracting into the interior of the housing body in a state that the operation member is positioned in a second position corresponding to an upper end of the groove.

8. The image capture apparatus according to claim 1, wherein the operation member and the cover are integrally formed from a hard synthetic resin.

9. The image capture apparatus according to claim 1, wherein:

the cover is positioned in a closed position closing the insertion/removal opening in a state that the operation member is positioned in the first position, and the cover is positioned in an opened position opening the insertion/removal opening and retracting into the interior of the housing body in a state that the operation member is positioned in the second position;

the operation member and the cover are integrally formed from a hard synthetic resin;

a plurality of the connectors and a plurality of the insertion/removal openings thereof, wherein the plurality of insertion/removal openings are arranged along a direction perpendicular to the direction of the reciprocal movement of the operation member; and a single piece of the cover is provided, and the insertion/removal openings of the plurality of connectors are opened and closed by the single cover.

* * * * *